(12) United States Patent
Fessel

(10) Patent No.: US 7,198,176 B2
(45) Date of Patent: Apr. 3, 2007

(54) LIQUID DISPENSER, HOLLOW DISPENSING NEEDLE KIT SYSTEM FOR SAID LIQUID DISPENSER, AND HOLLOW DISPENSING NEEDLE

(75) Inventor: Theodor Fessel, Ansbach (DE)

(73) Assignee: Poulten & Graf GmbH (DE)

( * ) Notice: Subject to any disclaimer, the term of this patent is extended or adjusted under 35 U.S.C. 154(b) by 0 days.

(21) Appl. No.: 11/047,438

(22) Filed: Jan. 31, 2005

(65) Prior Publication Data

US 2005/0127110 A1   Jun. 16, 2005

Related U.S. Application Data

(63) Continuation of application No. PCT/EP03/05979, filed on Jun. 6, 2003.

(51) Int. Cl.
  *B65D 88/54* (2006.01)
(52) U.S. Cl. .................................................... 222/318
(58) Field of Classification Search ................ 222/318
  See application file for complete search history.

(56) References Cited

U.S. PATENT DOCUMENTS 6,135,325 A   10/2000   Fessel

FOREIGN PATENT DOCUMENTS

| DE | 9218204 U1 | 9/1993 |
|---|---|---|
| DE | 19807647 A1 | 8/1999 |
| EP | 0937967 B1 | 2/1999 |
| EP | 0922939 A2 | 6/1999 |
| EP | 1 318 387 A2 | 6/2003 |
| EP | 1434037 A2 | 6/2004 |
| WO | WO 97/49974 | 12/1997 |

*Primary Examiner*—Philippe Derakshani
(74) *Attorney, Agent, or Firm*—Brooks Kushman P.C.

(57) ABSTRACT

The invention relates to a liquid dispenser, in particular to a dosing dispenser with a discharge tubule with an integral outlet duct for delivering a liquid via an outlet port and an integrated return duct which extends along the outlet duct, a discharge tubule kit system and a discharge tubule. The liquid dispenser contains a supplying device with a supplying or dosing cylinder, a supplying or dosing plunger which can be moved back and forth therein for supplying the liquid from a container to an outlet duct in order to dispense the liquid via an outlet port of the outlet duct, the said outlet duct being formed in an integral manner by a discharge tubule. According to the invention, the outlet port is formed for connection to the return duct by means of a connecting device, which extends integrally in the discharge tubule along the outlet duct.

36 Claims, 13 Drawing Sheets

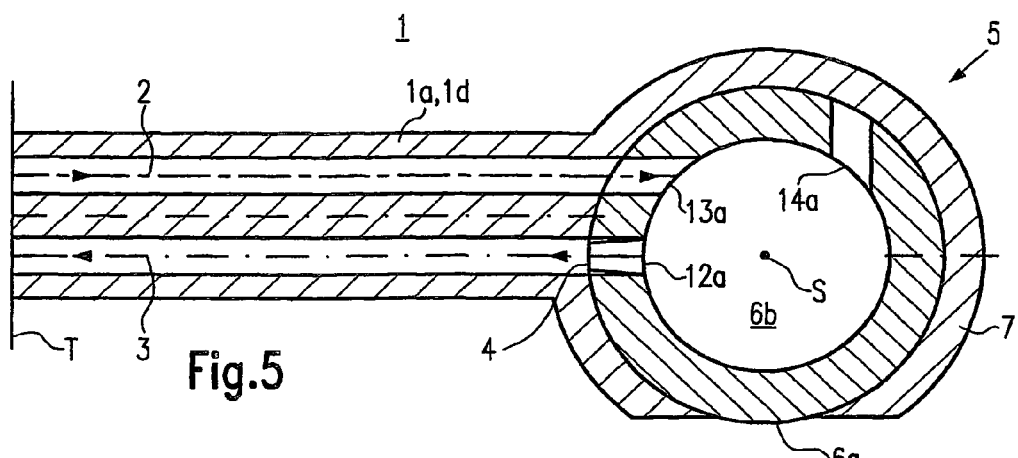
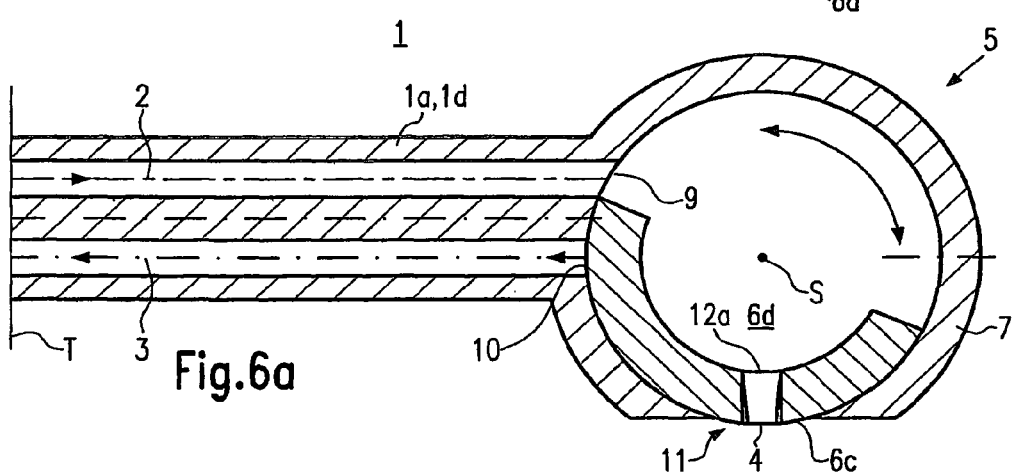
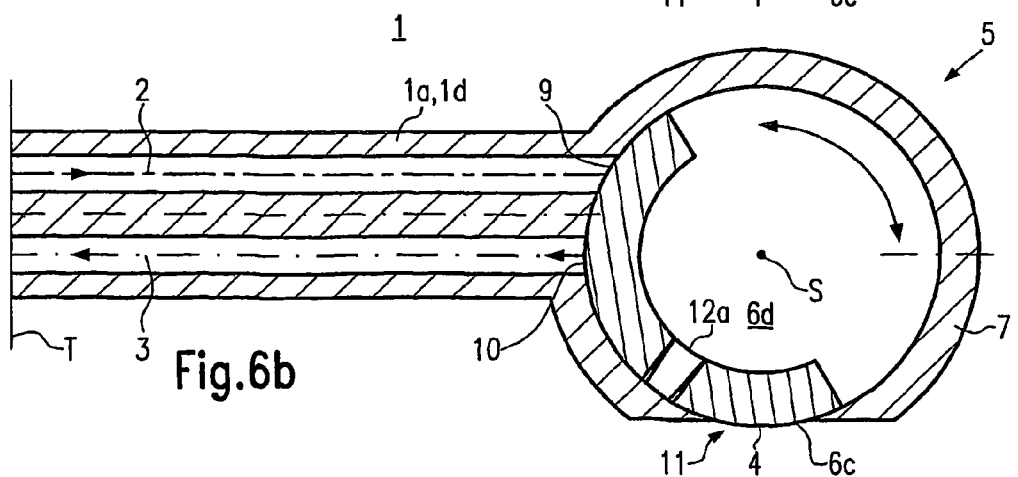

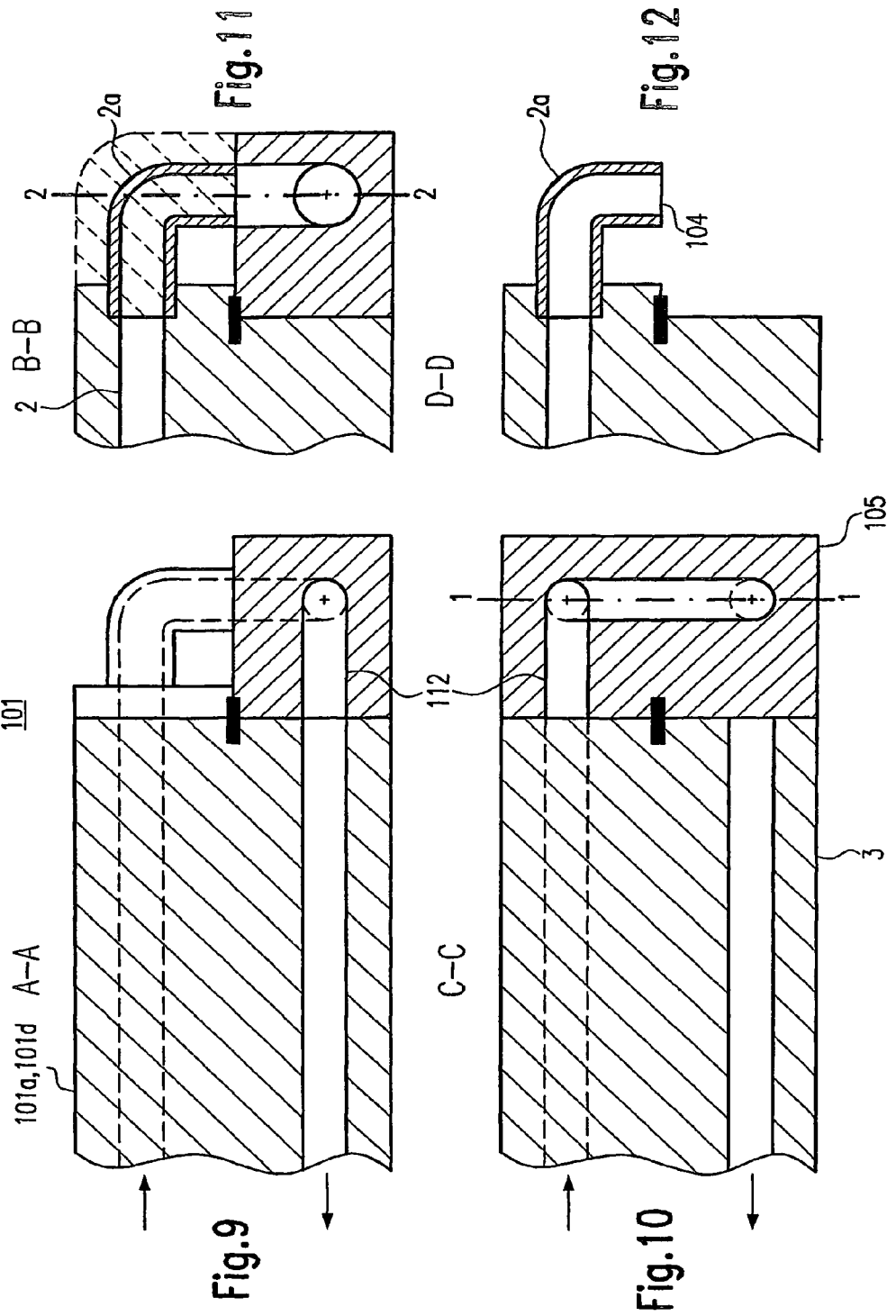

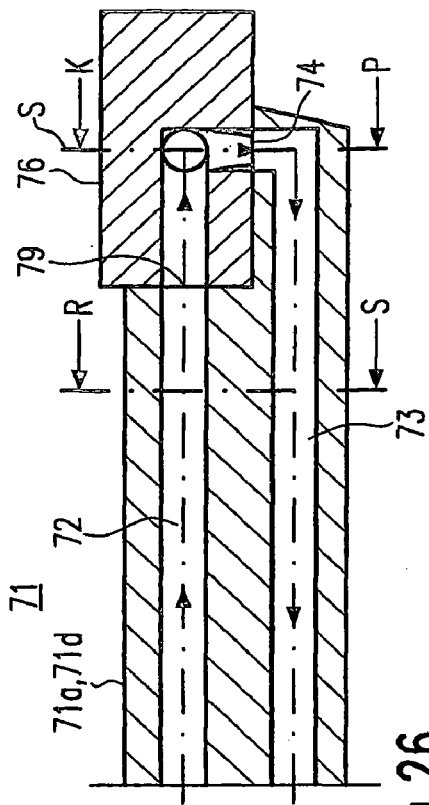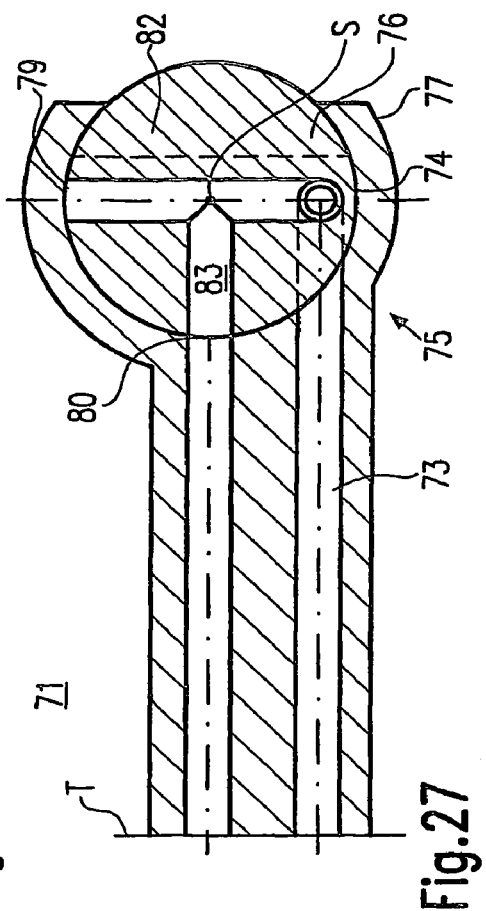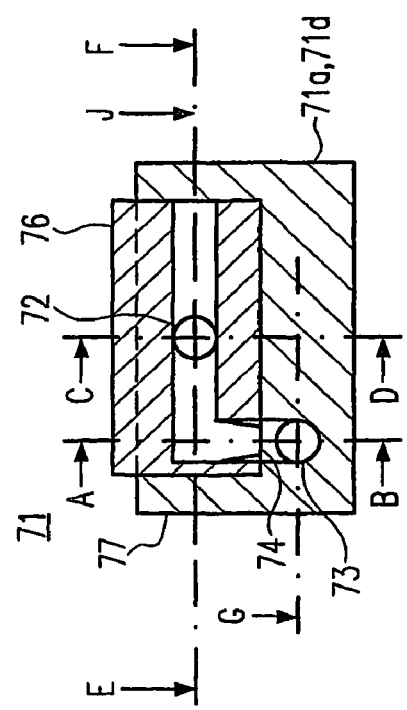
Fig.26
Fig.27
Fig.28

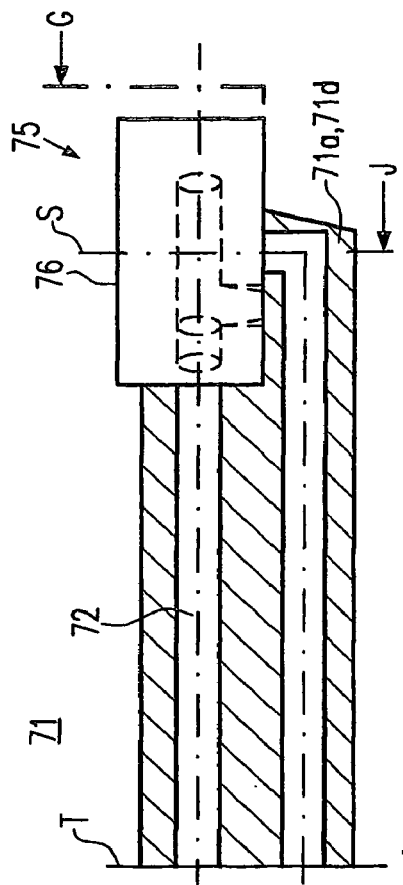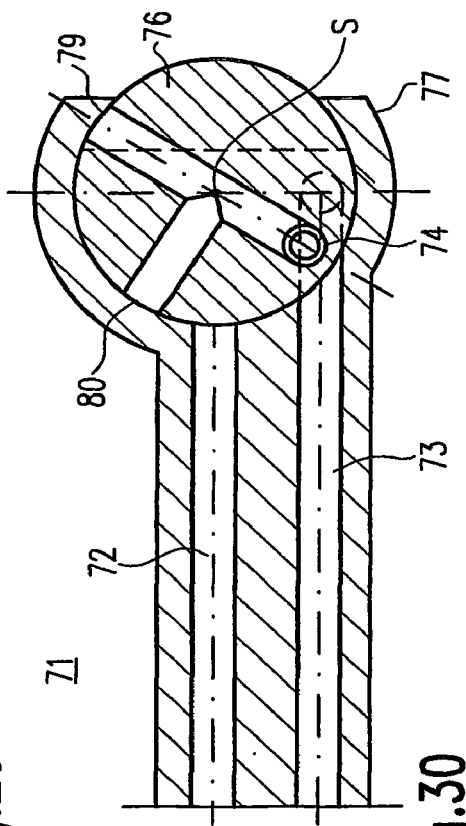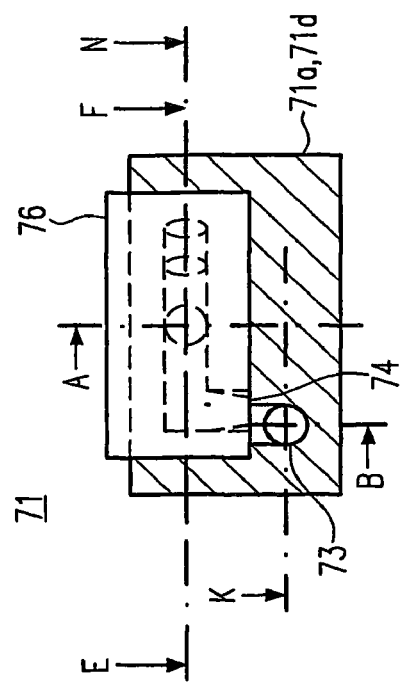

LIQUID DISPENSER, HOLLOW DISPENSING NEEDLE KIT SYSTEM FOR SAID LIQUID DISPENSER, AND HOLLOW DISPENSING NEEDLE

CROSS-REFERENCE TO RELATED APPLICATIONS

This application is a continuation of PCT/EP2003/005979, filed Jun. 6, 2003, designating the United States.

BACKGROUND OF THE INVENTION

1. Field of the Invention

The invention relates to a Liquid dispenser, in particular dosing dispenser, comprising a supplying device with a supplying or dosing cylinder, a supplying or dosing plunger movable therein for supplying liquid from a container to an outlet duct, for the delivery of the liquid via an outlet port of the outlet duct, wherein the outlet duct and a return duct extending there along are formed in a discharge tubule. Further, the invention relates to a discharge tubule kit system therefore and a discharge tubule, in particular for this type of liquid dispenser.

2. Background Art

From DE 41 37 351 C2 a liquid dispenser is known which comprises a valve block with a three-way valve, via which alternatively an amount of liquid supplied by a dosing cylinder from a container is either fed into an outlet duct arranged in a discharge tubule, or, essentially without passing through the discharge tubule, can be passed back directly into the container.

With this type of design it has however been found to be a disadvantage in that even when the valve is brought into the return position after an outlet process, a relevant amount of liquid always remains in the discharge tubule, which cannot be rinsed out and can therefore dry up or drip out. Moreover, the dosing accuracy at the start of a dosing process is problematical due to the large dead volume.

The first time this device is put into operation the amount of liquid to be dosed cannot be exactly measured, because the dead volume of the still unfilled outlet duct cannot be taken into consideration precisely. In order to obtain exact dosed amounts it is therefore necessary to fill the discharge tubule with liquid before the first time it is used, which however again gives the risk of an undesired outlet of liquid.

From DE 198 07 647 C2 a liquid dispenser of the type mentioned at the beginning is known, which comprises a common outlet duct and a return duct on one discharge tubule with an alternative connection of the return duct to the outlet duct, so that also a flushing mode is possible as well as liquid dispensing.

SUMMARY OF THE INVENTION

It is, therefore, an object of the invention to improve a liquid dispenser of the above mentioned kind such that the dead volume of the outlet duct is reduced or completely eliminated and an essentially complete liquid return into the associated reservoir is facilitated, so that the dosing precision and handling reliability of the liquid dispenser are improved and liquid losses are avoided. Moreover, it is an object of the invention to provide a discharge tubule kit system which increases the usage variability of discharge tubules in an uncomplicated manner, and to specify a discharge tubule, which comprises practically no dead volume in the flushing mode.

With regard to a liquid dispenser the object is solved according to the invention by the features of claim 1.

The object mentioned above is solved with regard to the discharge tubule kit system according to the invention by the features of claim 16.

With regard to the discharge tubule the object mentioned above is solved according to the invention by the features of claims 17 and 35.

Preferred embodiments of the liquid dispenser, the discharge tubule kit system, and of the discharge tubule are given in the respective subclaims.

While not only, as with a known liquid dispenser, a connection can be established between the dosing cylinder and container, with which however the outlet duct essentially carries no flow, but instead, according to the invention, the outlet duct and in particular the outlet port is a part of this connection between the dosing cylinder and container, it is also possible to prevent liquid residues, which are located between the outlet duct and the outlet port, from drying up or from flowing out of the outlet port to the unwanted outside air. Also, the dead volume is completely or essentially completely eliminated.

Consequently, it is in each case possible, on one hand, to facilitate a reliable return of liquid which is located in the outlet duct. Also, in this respect the liquid remaining in the section of the outlet port in the discharge tubule and consequently the dead volume are reduced to a minimum.

Regarding the definition of the term outlet port, it should be pointed out that as outlet port not just any point within the discharge tubule or the dosing dispenser is designated, but rather the point is designated as an outlet port at which, in dispensing or outlet mode, i.e. when liquid is passed out of the discharge tubule or the dosing dispenser, the liquid actually flows to the outside, i.e. leaves the discharge tubule or the dosing dispenser towards the outside. The outlet port is therefore taken to be the outermost or last cross-section, in the flow direction in the dispensing mode, of a supplying or outlet duct or of a supplying or outlet channel or of a tube carrying liquid, as far as it is still part of the inventive discharge tubule or device for discharging a liquid.

Due to the described embodiment, it is possible in an advantageous way, within the course of a flushing process comprising optionally a number of pumping strokes, to flush the outlet duct formed in the discharge tubule essentially completely and without complicated handling.

Since the discharge tubule according to the invention consists of one or many parts, it is also possible, within the scope of a discharge tubule kit system and in an advantageous manner, to form the base part of the discharge tubule integrally with or permanently connected to a valve block of a dosing dispenser, whereby variously formed change parts can be coupled to the free end of the base part in a releasable manner. In this way the liquid dispenser can be used again if the change part is damaged or the outlet port formed on it becomes blocked. Also, easy conversion to a different variant of discharge tubule is ensured if the discharge tubule or its base body is formed according to the invention with two or more parts or in a dividable manner.

In an advantageous manner the outlet duct and the return duct are formed preferably together in a discharge tubule produced from one synthetic material or, with a particularly high quality embodiment, from stainless steel. These types of embodiment of the discharge tubule has proved particularly advantageous under production viewpoints with regard to easy assembly and also facilitates effective stiffening of the discharge tubule.

The outlet duct and the return duct are preferably formed of the same length and each exhibit in an advantageous manner the same cross-section. In particular with an embodiment of the discharge tubule in a synthetic material both ducts each exhibit in an advantageous manner a circular cross-section and, in case of an injection molded embodiment, are each formed narrowing slightly conically in the longitudinal direction. With this embodiment a particularly high surface quality can be achieved with regard to the duct inner walls defining the two ducts. If the discharge tubule is produced from extruded material or is machined, for example from a Teflon semi-finished product, it is advantageous if the discharge tubule has a cylindrical or prismatic shape.

The outlet duct and the return duct are advantageously formed such that in an end section of the discharge tubule the opening of the outlet duct is assigned to an opening of the return duct in a directly adjacent manner. Consequently, direct bridging of the two ducts is possible. It is advantageous if the outlet duct and the return duct are formed such that their longitudinal axes run parallel to one another. The discharge tubule is here designed advantageously in that it comprises a circular, elliptical or preferably "8"-shaped cross-section in a plane cut perpendicular to the longitudinal axis of the outlet duct.

One embodiment of the invention, which is particularly advantageous with regard to ergonomic viewpoints, is given in that the connecting device comprises a spout element which is arranged in a section of the discharge tubule adjacent to the outlet port, whereby the spout element can be brought into a bridging position in which the outlet duct is connected to the return duct. The spout element is, in an advantageous manner, provided with a handle device for the manual selection between a connecting position, a discharge position and optionally also a closed position in which the outlet point of the discharge tubule is closed. The stated handle device is in an advantageous way, for example, formed integrally with the spout element in a synthetic material.

The spout element is in an advantageous manner formed as an adjusting core and is attached for swiveling or displacement to/in a base body of the discharge tubule, whereby it can be formed from a single piece or a plurality of pieces. The swiveling or displacement axis runs—depending on the preferred respective embodiment—essentially transverse to the discharge tubule (horizontally or vertically), radially to it or parallel to its central axis.

In a preferred embodiment of the device the discharge tubule is connected to a valve block, whereby a liquid feed channel and a liquid return channel, which are appropriately connected to the outlet duct and return duct, are formed in the valve block. This valve block is here advantageously produced from a synthetic material by injection molding or machining. According to a particularly advantageous production method, the liquid feed channel formed in the valve block and the liquid return channel formed in the valve block, too, can be formed by cylindrical core elements which protrude into the molding cavity within a molding tool for the formation of the valve block and which can be pulled off after the synthetic material has hardened.

With regard to an uncomplicated construction of a molding tool for the formation of the valve block, the discharge tubule is preferably formed as a separate component and only pressed into the valve block during an assembly stage. In this way, it is advantageously possible to combine different discharge tubules and optionally also different valve blocks according to requirements. The use of a press-fit device enables a particularly firmly connected, well-sealed attachment of the discharge tubule to the valve block. Alternatively, the discharge tubule can also be fitted to the valve block using a threaded means. In this respect the discharge tubule or a union nut is preferably provided with a threaded section.

The valve block can also be formed from a block of material, for example by machining. With regard to high chemical resistance, the valve block preferably consists of a Teflon, polypropylene (PP), polyethylene (PE) or polyamide material.

A particularly robust embodiment of the device, and one which is well sealed in the region of the dosing cylinder, is provided in that the supplying or dosing cylinder is formed integrally (in one piece) with the valve block. The supplying or dosing cylinder and the valve block and optionally also the discharge tubule can be formed in the inside of an appropriate mold tool within the scope of a single injection molding stage, so that after opening the mold tool a module consisting at least of the supplying or dosing cylinder and the valve block can be removed from the mold tool. The mold tool is in this respect formed advantageously at least in two parts, whereby a parting face running between both mold parts preferably runs essentially parallel to a plane which includes a central axis of the supplying or dosing cylinder.

An advantageous embodiment of the invention is provided with the integral formation of the supplying or dosing cylinder and valve block in that the supplying or dosing cylinder comprises a cylinder insert formed from a glass, ceramic or duroplastic material and which is accommodated in a jacket section formed in a single piece with the valve block, in particular being injection molded. In this way it is possible in an advantageous manner to provide an extremely high sealing effect between the internal wall of the supplying or dosing cylinder and a supplying or dosing plunger moving easily to and fro in the said cylinder. Due to this jacket section, preferably formed as a single-part with the valve block, an effective reinforcement and an effective splintering protection is provided for the cylinder insert.

An embodiment of the invention, which is advantageous with regard to a high saving of material, is given in that the valve block is formed as a skeleton construction with spaced webs. These spaced webs here run advantageously essentially parallel to a central axis of the supplying or dosing cylinder. The individual webs can be stiffened for further stiffening of the valve block by further, transverse connecting webs arranged in a trellis manner. In order to obtain a particularly robust attachment of the discharge tubule to a valve block formed with this type of skeleton construction, a holding recess is arranged in an advantageous manner for accommodating a base section of the discharge tubule such that it passes radially through one of the axially extending webs. A central axis of the preferably cylindrical holding recess here runs advantageously in an appropriate central plane of the axially extending stiffening web. The holding recess is here advantageously accommodated in a pot-shaped wall section. This pot-shaped wall section can also be further stiffened by more, for example radial transverse, stiffening webs.

In order to facilitate attachment of the discharge tubule to the valve block as positionally accurate as possible, a positioning device, formed in an advantageous manner through appropriate sections of the valve block and discharge tubule, defines the attachment position of the discharge tubule unambiguously on the valve block. This positioning device can here either exhibit an engaging section formed on the tubular side, which can be brought into engagement with an engaging counter section formed on the valve-block side, or it can exhibit an engaging section formed on the valve block in the region of the holding recess and which can be brought into engagement with an engaging counter section formed on the tubular side.

In order to ensure a high sealing effect and a particularly firm seating of the discharge tubule in the valve block, a number of sealing plates are preferably formed on an attachment section of the discharge tubule, the said plates coming into contact under high surface pressure with an appropriate internal circumferential section of a holding recess formed in the valve block.

Advantageously in this respect, the connecting device can be brought into a first position, in which the outlet duct is located in a flow connection with the outlet port, whereby the return duct is closed towards the outside by the adjusting device so that liquid can be supplied without hindrance through the outlet port to the outside. In a second position of the connecting device the outlet duct and the return duct are in a flow connection, wherein the outlet port is part of the liquid connection so that flushing can occur of essentially all the channels and ducts or tubes through which liquid flows, including those on which the outlet port is located.

Advantageously, the connecting device can be brought into at least a third position in which the outlet duct and the return duct are separated from one another and each is closed towards the outside.

In this position the outlet port is also advantageously closed towards the outside. Consequently, it is ensured that none of the ducts, channels or tubes present in the discharge tubule or in the connecting device containing same is open to the outside so that no contact between the liquid in the discharge tubule and the environment (e.g. air) can occur. In this way drying out of the liquid in the discharge tubule is prevented in an advantageous manner and possible dripping out of remaining liquid can be reliably prevented.

In an advantageous manner the connecting device comprises an adjusting core, which can be rotated about an adjusting axis, whereby the adjusting core is preferably arranged in an adjusting sleeve. In this way a sealing surface or a sealing region is formed between the adjusting core and the adjusting device, whereby it is ensured that an unintentional emission or drying out of liquid is reliably prevented. Also an easy adjustment and secure holding or assembly of the adjusting core in the adjusting sleeve is facilitated.

Preferably here the adjusting sleeve is formed as an integral member of the discharge tubule, in particular produced integrally by molding, e.g. in synthetic material or another suitable material. In an advantageous manner the adjusting sleeve comprises a cavity in its interior, which is essentially filled out completely or at least in the marginal region of the cavity by the adjusting core. The cavity is connected here in an advantageous manner to the outlet duct through a first opening and to the return duct through a second opening and is open to the outside through a third opening so that a flow of liquid out of the outlet duct through the cavity to the return duct or to the outside is facilitated.

In the adjusting core there are at least one, but preferably many channels formed, which have a liquid or flow connection with one other. In an advantageous manner at least one part of a channel is formed in a region of the adjusting axis. In the case of a number of channels, they are arranged such that a flow connection exists between the channel which can be connected to the outlet duct and the channel which can be connected to the return duct, and the channels are in particular L-shaped or U-shaped. However, it is also conceivable that the channel or channels are connected to one another via a cavity into which they lead.

Preferably the adjusting core is at least partially formed as a rotational body (or as a segment or part thereof) with regard to the adjusting axis and is in particular spherically, conically, cylindrically or toroidally shaped. In this way easy adjustment is facilitated by simple rotation of the adjusting core within the adjusting sleeve and an exact fit is possible. A hollow interior shape is also in each case conceivable.

Advantageous further developments and other features of the device for dispensing a liquid as well as of the discharge tubule and of the kit system for discharge tubules are the object of the respective subclaims.

BRIEF DESCRIPTION OF THE DRAWINGS

The invention is explained in more detail based on embodiments and accompanying drawings. In these drawings it is shown.

DETAILED DESCRIPTION OF THE PREFERRED EMBODIMENTS

Figure 1:
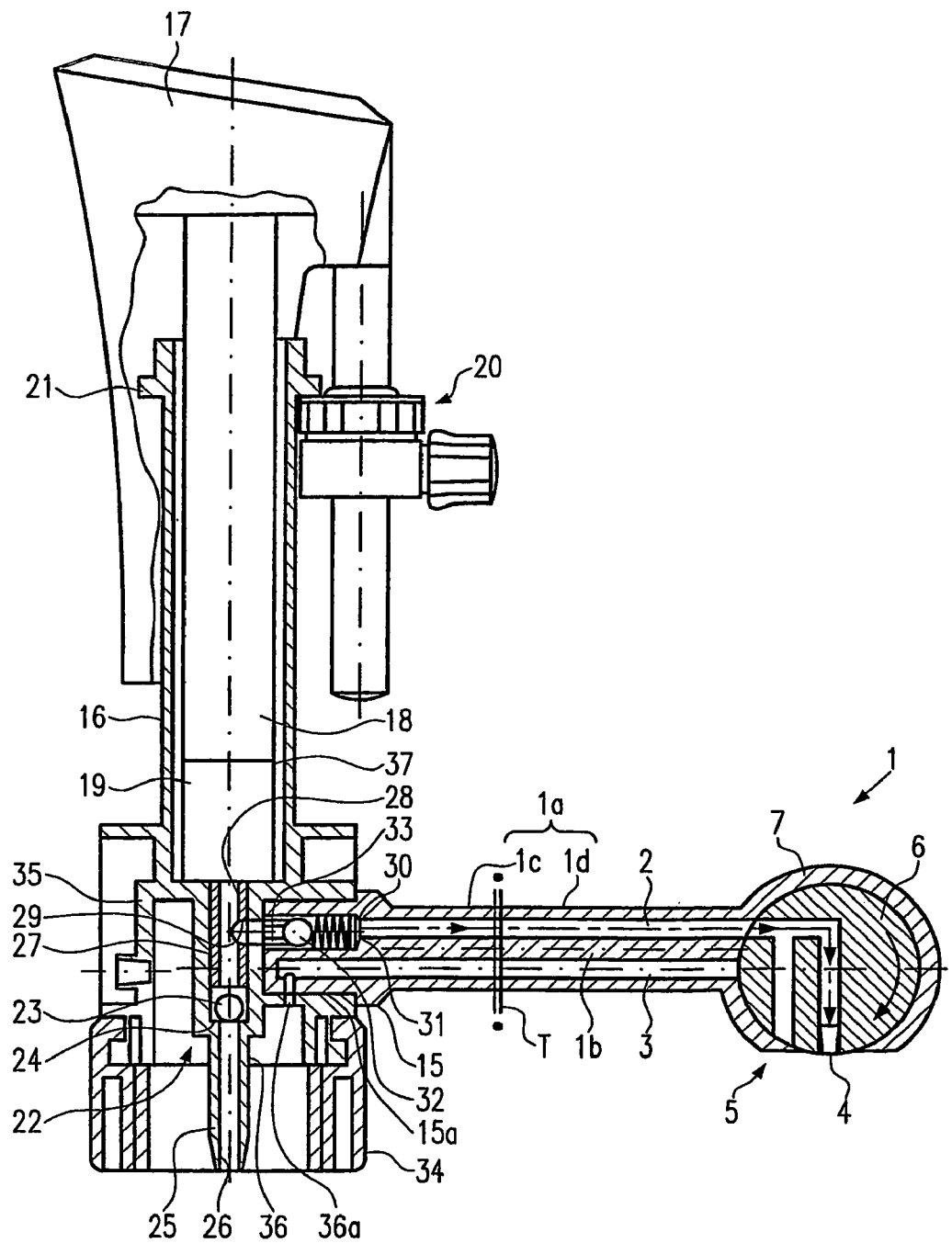
FIG. 1 a partially sectioned overall view of a first embodiment of a liquid dispenser with discharge tubule, FIG. 2 a partial sectional view of the first embodiment of a discharge tubule in a dispensing operating position, FIG. 3 a partial sectional view of the first embodiment of the discharge tubule in the return operating position, FIG. 4 a partial sectional view of a first embodiment of the discharge tubule in the closed position, FIG. 5 a partial sectional view of a second embodiment of a discharge tubule in the return operating position, FIG. 6*a* a partial sectional view of the second embodiment of the discharge tubule in the dispensing operating position, FIG. 6*b* a partial sectional view of the second embodiment of the discharge tubule in the closed position, FIG. 7 a cross-sectional view of a third embodiment of the discharge tubule in the dispensing operating position, FIG. 8 a cross-sectional view of the third embodiment of the discharge tubule in the return operating position, FIG. 9 a longitudinal sectional view of the third embodiment of the discharge tubule shown in FIGS. 7 and 8 along the line A—A, FIG. 10 a longitudinal sectional view of the third embodiment of the discharge tubule shown in FIGS. 7–9 along the line C—C, FIG. 11 a longitudinal sectional view of the third embodiment of the discharge tubule shown in FIGS. 7–10 along the line B—B, FIG. 12 a longitudinal sectional view of the third embodiment of the discharge tubule shown in FIGS. 7–11 along the line D—D, FIG. 13 a partial sectional view of a fourth embodiment of a discharge tubule in a dispensing operating position, FIG. 14 a partial sectional view of the fourth embodiment of the discharge tubule according to the invention in the return operating position, FIG. 15 a partial sectional view of the fourth embodiment of the discharge tubule in the closed position, FIG. 16 a horizontal section of a fifth embodiment of a discharge tubule in a dispensing operating position, FIG. 17 a horizontal section of the fifth embodiment of the discharge tubule in the return operating position, FIG. 18 a horizontal section of the fifth embodiment of the discharge tubule in the closed position, FIG. 19 a vertical section of the fifth embodiment of the discharge tubule illustrated in FIG. 16 in the dispensing operating position along the line E—E, FIG. 20 a vertical section of the fifth embodiment of the discharge tubule illustrated in FIG. 17 in the return position along the line F—F, FIG. 21 a vertical section of the fifth embodiment of the discharge tubule illustrated in FIG. 18 in the closed position along the line G—G, FIG. 22 a vertical section of the fifth embodiment of the discharge tubule in an alternative closed position, FIG. 23 a vertical section of a sixth embodiment of a discharge tubule in a dispensing operating position along the sectioning lines A-B/C-D, FIG. 24 a horizontal section of the sixth embodiment of the discharge tubule illustrated in FIG. 23 in the dispensing operating position along the sectioning lines E-F/G-J, FIG. 25 a vertical section of the sixth embodiment of the discharge tubule illustrated in FIGS. 23 and 24 in the dispensing operating position along the sectioning lines R-S/K-P, FIG. 26 a vertical section of a sixth embodiment of a discharge tubule in a return operating position along the sectioning lines A-B/C-D, FIG. 27 a horizontal section of the sixth embodiment of the discharge tubule illustrated in FIG. 26 in the return operating position along the sectioning lines E-F/G-J, FIG. 28 a vertical section of the sixth embodiment of the discharge tubule illustrated in FIGS. 26 and 27 in the return operating position along the sectioning lines R-S/K-P, FIG. 29 a vertical section of the sixth embodiment of a discharge tubule in a closed position along the sectioning line A-D, FIG. 30 a horizontal section of the sixth embodiment of the discharge tubule illustrated in FIG. 23 in the closed position along the sectioning lines E-F/K-N, FIG. 31 a vertical section of the sixth embodiment illustrated in FIGS. 23 and 24 in the closed position along the sectioning line G-J, FIG. 32 a partially sectioned overall view of a seventh embodiment of a liquid dispensing device according to the invention with discharge tubule, FIG. 33 a partial sectional view of the seventh embodiment of a discharge tubule according to the invention in a dispensing operating position, FIG. 34 a partial sectional view of the seventh embodiment of the discharge tubule according to the invention in a return operating position, and FIG. 35 a partial sectional view of the seventh embodiment of the discharge tubule according to the invention in a venting position.

In FIG. 1 a first embodiment of a liquid dispenser in the form of a dosing dispenser is illustrated with an integrally supplying or dosing cylinder and a discharge tubule with integrally formed return duct. The discharge tubule 1 is here shown in a preferred embodiment in various operating positions in FIGS. 2 to 4.

The discharge tubule 1 illustrated in FIGS. 1 to 4 comprises a base body 1a, which is preferably produced of a synthetic material, but also other suitable materials, in particular for example, metals, ceramics, etc. are conceivable.

The base body 1a of the discharge tubule 1 can here be formed in one piece; however it is preferably formed to be separable and/or dividable into two or more parts. As indicated in FIG. 1, the base body 1a in the embodiment described here comprises a base part 1c and an change part 1d, which are connected to one another in a liquid sealed manner, so as to be dividable at a separation point T. The connection can for example be formed as a plug or screw connection, but also a bayonet connection; a conical clamping coupling with union nut or any other suitable coupling of base part 1c and change part 1d are conceivable, too. On the base part 1c a mounting section 15 for the attachment of the discharge tubule 1 to a dosing dispenser device or a valve block 35 is provided. On the change part 1d an adjustment device 5 and an outlet port 4 of the discharge tubule 1 are provided.

In this way a kit system for the alternative connection of various discharge tubules to the liquid dispenser is formed in a simple manner.

An outlet duct 2 and return duct 3 are formed in the base body 1a of the discharge tubule 1. The outlet duct 2 and the return duct 3 are separated from one another by a partition section 1b, which is formed integrally with the base body 1a. Both the outlet duct 2 and also the return duct 3 exhibit preferably a circular cross-section and in the embodiment illustrated here lead into the jacket surface of a cavity of an adjusting device 5, said jacket surface being rotationally symmetrical with respect to an adjusting axis S. Other cross-sectional shapes of the ducts or channels are also conceivable. With a divisible base body 1a the ducts are each formed in each of the parts 1c, 1d so that they are located flush in the coupled state and liquid can flow without loss through the discharge tubule 1.

Accordingly, with a base body 1a formed in a single piece, the discharge tubule 1 is provided with an attachment section 15, via which the discharge tubule 1 can be fitted to a valve block designated here by the reference symbol 35. In the embodiment illustrated here, the attachment section 15 comprises an essentially cylindrical press-fit pin section 15a, which is press-fitted, tightly sealing, into an appropriately formed fitting hole in the valve block 35.

Alternatively to the illustrated embodiment of the attachment section 15, it is also possible to form the discharge tubule 1 or its base body 1a integrally with the valve block or for example to connect it to the valve block 35 using a threaded device. The threaded device is advantageously designed such that in the tightened state no cavity remains between the thread faces. This can in particular be achieved by a slightly conical thread. This type of formation or integral/single-part formation of the valve block 35 and the base body 1a is preferably provided with a base body of a number of parts, whereby the base part 1c is then formed integrally with the valve block 35.

In the illustrated valve block 35 a liquid feed channel 26 and a liquid return channel 36 are formed.

The liquid feed channel 26 comprises a suction valve 23, 24 and leads into the supplying or dosing chamber 19. The said channel is also flow-connected to the outlet duct 2 via a face-side through opening 29 formed in the attachment section 15. The return duct 3 formed in the base body 1a of the discharge tubule 1 is connected to the liquid return channel 36 via a through hole 36a radially penetrating the attachment or press-fit pin section 15a or threaded pin section. The liquid return channel 36 is here formed as an essentially straight channel and extends from a lower region of the valve block 35 to the attachment section 15. Due to the high surface pressure between the attachment section 15 and the inner wall of the mounting hole formed in the valve block 35, a good sealing of the transition region between the return duct 3 and the liquid return channel 36 formed in the valve block 35 is obtained.

With the embodiment illustrated here the outlet duct 2 and the return duct 3 are formed adjacently. It is also possible to form the outlet duct 2 and the return duct 3 coaxially with respect to one another so that one of the two ducts is formed by an appropriately dimensioned annular space. The return duct 3 extends continuously uninterrupted from the outlet port of the outlet duct 2 back to the valve block 35.

An essentially complete flushing of the outlet duct 2 can for example be achieved in that a cap element is placed on the base body 1a in the region of the jacket surface 8, the said jacket element establishing a connection between the outlet duct 2 and the return duct 3.

In the preferred embodiment illustrated in FIG. 1, instead of this type of bridging device a connecting device 5 is used as described in the following in conjunction with FIGS. 2–4.

Figure 2:
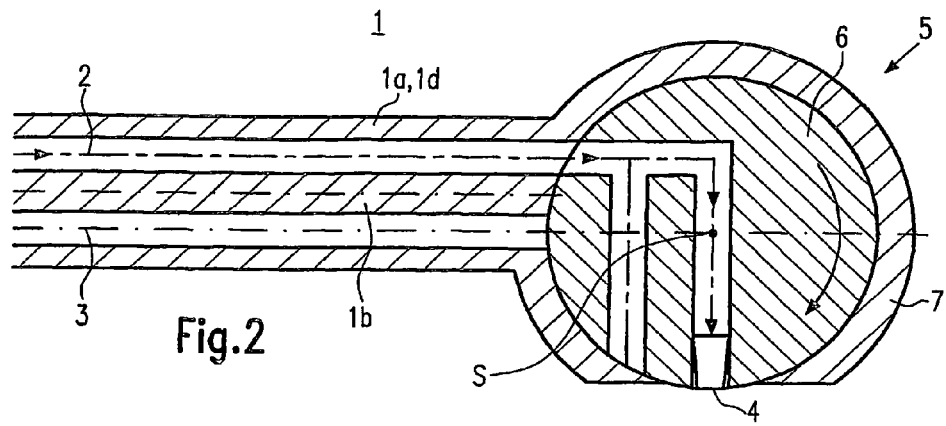
Figure 3:
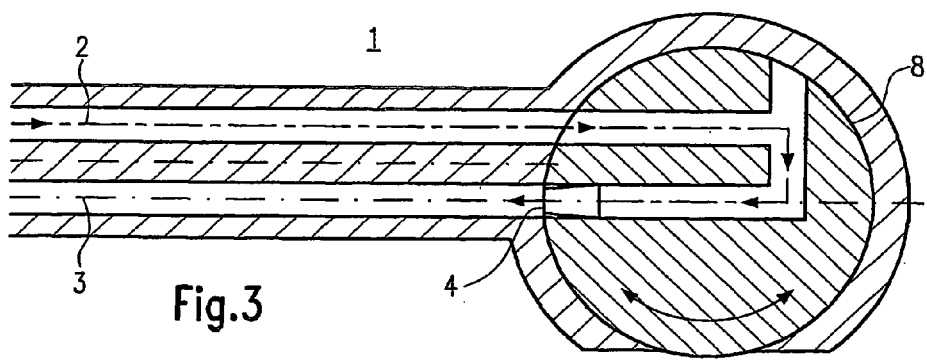
Figure 4:
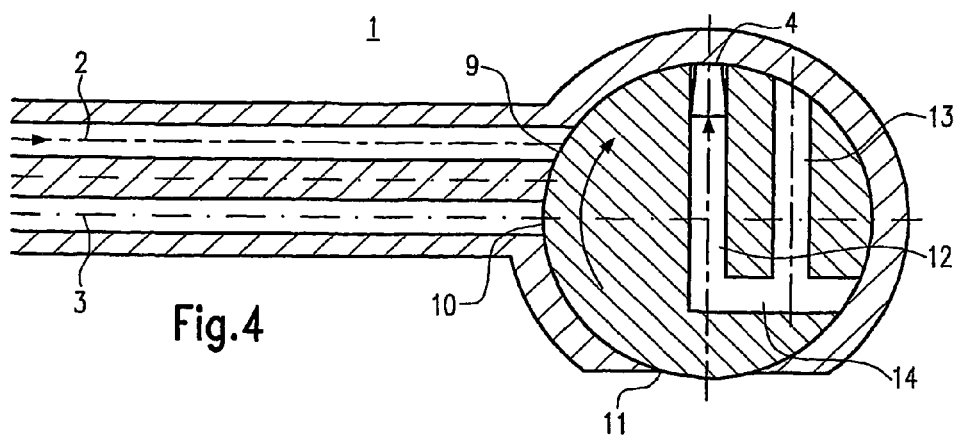

The embodiments according to FIGS. 2 to 4 are identical apart from respective different positions of the connecting device 5.

Departing from the presentation according to FIG. 1, the valve block 35, provided for the accommodation of the discharge tubule 1 for the device for discharging liquid is no longer shown in these illustrated embodiments of a dosing dispenser.

The discharge tubule 1 illustrated here is attached with its end (not shown here) of the base body 1a or its base part 1c to the valve block 35 in the same manner as has previously been explained in conjunction with FIG. 1.

At the end of the base body 1a or of the base part 1c facing away from the valve block, the discharge tubule 1 is provided with a connecting device 5, which is connected to or produced together with the base body 1a or the change part 1d. In the position illustrated in FIG. 2 the connecting device 5 is located in a discharge position and permits the outlet of a liquid via the outlet duct 2 which liquid is sucked by the supplying or dosing cylinder, at first via a suction duct, not shown here, then via the liquid feed channel 26.

In the illustrated embodiment the connecting device 5 comprises an adjusting sleeve 7 and an adjusting core 6 which is arranged in a cavity 8 formed in the adjusting sleeve 7. In this respect the adjusting sleeve 7 is formed integrally with the base body 1a of the discharge tubule 1, preferably in one molding. The adjusting core 6 is, as illustrated in FIGS. 2 to 4, preferably round in cross-section or, in a related embodiment, ring-shaped. The adjusting body is overall at least partially formed as a rotational body with regard to an adjusting axis S, in particular having a spherical, conical, cylindrical or toroidal shape.

In the embodiment of a discharge tubule 1, as illustrated in FIGS. 2 to 4, three channels 12, 13, 14 are formed within the adjusting core, said channels being connected for the passage of liquids or other flow. In this respect the channels are arranged such that in a discharging or dispensing operating state, i.e. in a position in which the liquid can be discharged to the outside, the channel 14 extends in an extension of the outlet duct 2. The channel 14 continues, preferably at right a angle, into the channel 12 at the one end of which is located the outlet port 4, where the channel 12 terminates at the circumferential or jacket surface of the adjusting core 6.

Similarly, with the channels 14 and 12 a third channel 13 is provided which, in a return operating state, i.e. in a position of the connecting device 5, in which the liquid is supplied through the return duct, is formed in an extension of the outlet duct 2 in the adjusting core 6. The third channel 13 extends preferably essentially parallel to the channel 12 at the outer end of which the outlet port 4 is located.

"Outlet port" here indicates the point at which, in the dispensing or discharging mode, i.e. when liquid is discharged from the discharge tubule or the dosing dispenser, the liquid actually passes to the outside, that is, it leaves the discharge tubule or the dosing dispenser towards the outside. The outlet port therefore designates in the dispensing mode in the direction of flow the outermost or last cross-section of a supplying or outlet duct or of a supplying or outlet channel or of a tube with liquid flowing through it, provided it is still a part of the liquid dispenser or of the discharge tubule.

In this regard, in the following description the term outlet port is retained, defined positionally, with respect to the stated cross-sectional region of the associated duct or tube or with respect to the associated channel even when the discharge tubule or the liquid dispenser is not in the discharge mode, i.e. no liquid is discharged from the discharge tubule or the dosing dispenser to the outside, but rather the stated cross-sectional region is used for the passage of liquid in order to pass liquid within the discharge tubule in a different operating state than the dispensing mode.

In the return operating position liquid can therefore flow through the outlet duct 2 into the channel 13 and from here further into the channel 12 and through the outlet port 4 into the return duct 3. The outlet duct 2 here terminates in a first opening 9 at the cavity 8 of the adjusting sleeve 7. The return duct 2 is similarly connected to the cavity 8 of the adjusting sleeve 7 by a second opening 10.

The cavity 8 itself is opened to the outside by a third opening 11 in the adjusting sleeve 7. The opening 11 is, for example, formed by the flattening of a round or convex outer shape of the adjusting sleeve 7. All three openings 9, 10, 11 can be closed alternatively individually or together by rotating the adjusting core 6 and are sealed by the jacket surface of the adjusting core 6, which is held rotationally in the adjusting core 7.

In FIGS. 5, 6a and 6b a second embodiment of the discharge tubule is illustrated in a return operating position, in a discharge position and in a closed position, whereby the discharge tubule essentially corresponds in its construction and in its single and multipart feature of the base body 1a to the first embodiment illustrated in FIGS. 1 to 4. A difference here however is that an adjusting core 6a is supported in the adjusting sleeve 7, which comprises a further cavity 6b in its interior, in which the channels 12a, 13a, 14a lead and in this respect are connected together via the cavity 6b for the passage of flow.

Whereas with the second embodiment of the discharge tubule illustrated in FIG. 5 the adjusting core 6a is shown as a ring-shaped adjusting core in the illustrated cross-section, which forms a closed ring, and which is penetrated on its outer side just by the channels 12a, 13a and 14a, FIGS. 6a and 6b illustrate a variation of this adjusting core.

With this variation illustrated in FIGS. 6a and 6b the adjusting core is formed as a ring segment which preferably comprises a 180° segment angle. In the region of this ring segment only one channel, channel 12a, is formed, which connects the cavity in the interior of the adjusting sleeve or adjusting core to the outlet port 4.

The first opening 9, at which the outlet duct 12 terminates, and the second opening 10, at which the return duct 3 begins, are either closed individually or together via the formed segment of the adjusting core 6a or released via the ring piece of the adjusting core which is not formed. Consequently, a liquid flow is possible between the outlet duct, cavity 6d and the return duct with the simultaneous closure of the outlet port 4 and the channel 12a. Also all other functions of the second embodiment of the discharge tubule in their two variations illustrated in FIG. 5, respectively 6a and 6b, can be realized according to the first embodiment of the discharge tubule according to the invention.

In this respect FIG. 6b shows a closed position of this embodiment with which all channels 2, 3, 4 are sealed, so that emission of liquid from the discharge tubule to the outside is prevented and also a flow within the discharge tubule is avoided. In this position all channels and also the cavity 6d are each however closed separately from one another so that any drying out of the liquid can be reliably prevented.

By reduction of the volume of the further cavity 6d to a necessary minimum, the liquid remaining in the region of the adjusting device 5 can also be reduced to a minimum.

The functioning principle of the second embodiment of a discharge tubule according to the invention, illustrated in FIGS. 5, 6a and 6b, corresponds otherwise to that of the first embodiment, as it is illustrated in FIGS. 1 to 4.

Further it must be pointed out that the adjusting core 6, 6a can be surrounded on its outer circumferential surface or jacket surface with a sliding layer or a sliding element, which interacts with a corresponding sliding layer or a corresponding sliding element on the inner side (cavity 8) of the adjusting sleeve 7 in order to facilitate an especially easy movement of the adjusting core 6 relative to the adjusting sleeve 7 and in order furthermore to ensure reliable sealing of the outlet duct respectively return duct 2, 3 and of the channels 12, 12a, 13, 13a, 14, 14a.

The sliding layers or sliding enclosures are preferably formed from a glass, synthetic material or ceramic material and provided with appropriate through openings, which correspond to the openings of the ducts or channels. On one side of the adjusting core 6, 6a an "unillustrated" operating device or handle, in particular a rotating handle is connected to the adjusting core, through which it can be manually operated or operated using a remotely controlled connecting device. Preferably latching elements or end stops are provided on the operating device, on the adjusting core and/or on the adjusting sleeve to facilitate a reliable and accurate positioning of the adjusting device 5 in the individual operating states.

A further advantage of the discharge tubule according to the invention as in the embodiments described is that the connecting device 5 can be brought into a closed position (cf. FIG. 4), in which the outlet duct 2 as well as the return duct 3 as well as the outlet port 4 of the channel 12 are closed so that no liquid can unintentionally be emitted from the discharge tubule 1 to the outside. In this position it is also ensured that no liquid located in a part of the discharge tubule or the dosing dispenser can dry out, because, as described, all openings to the outside are closed.

In the following, further details of a device for the discharge of a liquid in a preferred embodiment of a dosing dispenser are explained in more detail based on FIG. 1.

The embodiment according to FIG. 1 illustrates an axial sectional view through a dosing dispenser with a supplying or dosing cylinder 37 formed integrally with the valve block 35, whereby the supplying or dosing cylinder 37 is accommodated in a jacket section 16, formed integrally with the valve block 35. In the supplying or dosing cylinder 37 a supplying or dosing plunger 18 is accommodated which can be moved in the vertical direction upwards and downwards using a handle device 17. With the embodiment illustrated here the supplying or dosing plunger is formed as a precision ground plunger and in the supplying or dosing cylinder 37 confines supplying or dosing space 19 being variable with regard to its volume.

The permissible stroke of the supplying or dosing plunger 18 can be set with an adjusting device 20 and therefore the maximum volume of the supplying or dosing space 19 can also be set. The setting device 20 interacts here with an end stop 21 which is formed integrally with the jacket section 16. The end stop 21 surrounds an upper end section of the supplying or dosing cylinder 37 and forms also a reinforcement component for the reinforcement of the upper opening of the supplying or dosing cylinder 37.

In the valve block 35 a container valve 22 is provided which in the embodiment illustrated here comprises a valve ball 23, which is seated on a precision valve seat 24, which in the embodiment illustrated here is formed by a precision-molded surface section of the valve body 35. A suction channel 26 formed in a hose spigot 25 extends below the container valve 22. The opening stroke of the valve ball 23 is limited by a bush element 27 which is pressed into the valve block 35 through the supplying or dosing cylinder 37.

The bush element 27 forms a liquid passage 28, which links the suction channel 26 to the supplying or dosing space 19 via the container valve 22. The bush element 27 is provided with a radial through opening 29 which connects the liquid passage 28 to a pressure valve 30 accommodated in the base body 1a of the discharge tubule 1. The pressure valve 30 accommodated in the base body 1a comprises a valve ball 32 forced into a closed position by a spring 31 and a valve seating element 33 pressed into the base body 1a of the discharge tubule and which here in the illustrated embodiment is formed from a synthetic material, glass or ceramic material.

The stated valve spring 31 sits in the outlet duct 2 which is formed in the discharge tubule 1 and which extends through from the pressure valve 30 to its opening 9 (cf. FIGS. 1, 4).

The opening 9 of the outlet duct 2 is arranged immediately adjacent to the opening 10 of the return duct 3. The return duct 3 running in the discharge tubule 1 comprises essentially the same length as the outlet duct 2 formed in the discharge tubule. The discharge tubule 1 is pressed into the valve block 35 by means of the press-fit pin section 15a. The press-fit pin section 15a is provided with a radial through hole 36a, which is connected to a liquid passage device or liquid return channel 36 formed in the valve block 35 and through which any liquid supplied via the return duct can return into the container (not illustrated).

The valve block 35 is formed here as a skeleton construction and can be fitted to a container or for example also to a supply socket of an automatically operated dosing device using a union nut 34. Alternatively to the embodiment illustrated here with a press-fit discharge tubule 1 it is also possible in an advantageous manner to form the discharge tubule 1, the valve block 35 and the jacket section 16 integrally, i.e. as an integral part. With an appropriate integral embodiment the valve seating element 33 can in an advantageous manner be omitted and an appropriate valve seating surface is formed by a circumferential wall which forms the radial through hole forming the bush element 27. The valve ball 32 and optionally also the valve spring 31 are preferably inserted into the valve block 35 before the bush element 27 is pressed in.

A third, different embodiment of a discharge tubule is illustrated in FIGS. 7 to 12. The details not illustrated or not further described correspond to the construction of the previously described embodiments of a discharge tubule; in particular its base body 101a can again be realized in one or more parts as previously described.

Figure 8:
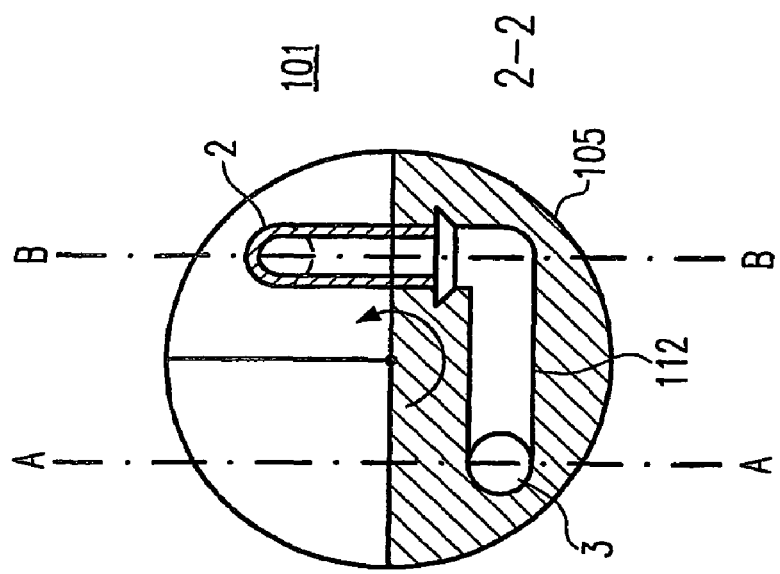

Therein, FIGS. 9 and 11 show the discharge tubule 101 in a return operating state, respectively, in a longitudinal section in the planes A—A respectively B—B. FIG. 8 illustrates a cross-section of the discharge tubule 101 in the return operating state.

Figure 7:
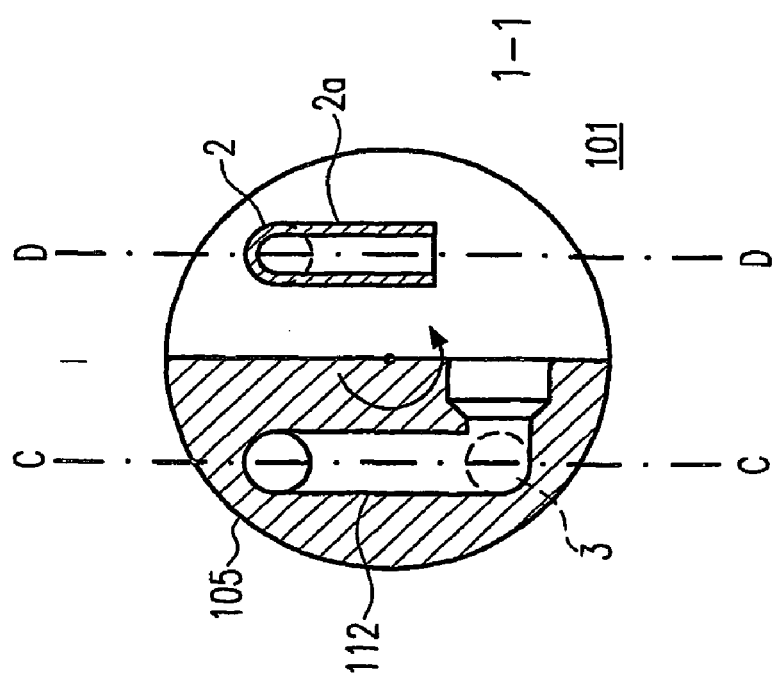

FIGS. 10 and 12 in turn illustrate a longitudinal section through the discharge tubule 101, respectively, this time in a dispensing or discharging operating state along the planes C—C respectively D—D. FIG. 7 illustrates in this respect a cross-section through the discharge tubule 101 in a plane 1—1 as it is illustrated in FIG. 10.

In FIGS. 7 and 8 the outlet duct 2 is in each case shown in the top right region of the discharge tubule 101, illustrated circular shaped in cross-section, whereby the return duct 3 is located in the bottom left region of the circular shaped cross-section. In FIGS. 9 to 12 in each case the outlet duct 2 is shown at the top and the return duct 3 at the bottom. On the face side of the discharge tubule 101 a semi-cylindrically shaped closure sliding part 105 is arranged rotationally about a central axis of the circular shaped discharge tubule 101 using a suitable support.

The outlet duct 2 comprises a tubular outlet extension 2a which is preferably bent downwards and which comes out of the face side of the discharge tubule 101 and terminates on an outlet port 104, as shown for example in FIG. 12. In the rotational closure sliding part 105 a connecting channel 112 is formed which in the return operating state extends the outlet duct 2, connecting to the outlet port 104, and connects it to the return duct 3.

To open the discharge tubule 101 the closure sliding part 105, preferably formed semi-cylindrically, is rotated in the clockwise direction by 90° about the central axis of the discharge tubule 101, whereby the outlet port of the outlet duct is released and simultaneously the return duct 3 is closed on the face side of the discharge tubule 101.

An advantage of the embodiment of a discharge tubule 104 illustrated in FIGS. 7 to 12 is that also no dead volume remains unflushed in the ducts or channels in the return operating state. Also the dripping out or drying out of the liquid residues possibly remaining in the ducts is eliminated, because by rotating the closure sliding part 105 the outlet duct 2, the return duct 3 and especially the outlet port 104 can be completely closed off from the environment (e.g. air). In an advantageous embodiment the outlet extension 2a is formed in an essentially quarter-circular shaped extension of the base body 101a of the discharge tubule 101, as indicated in FIG. 11 by a dashed line, so that the outlet extension 2a is essentially protected from damage by impact.

Also this embodiment of the discharge tubule 101 can be used at any time as illustrated or with deviations with a liquid dispenser, especially in a dosing dispenser.

A fourth embodiment of the discharge tubule is described in the following, wherein again only the differences to the embodiments already described are pointed out and illustrated.

Figure 13:
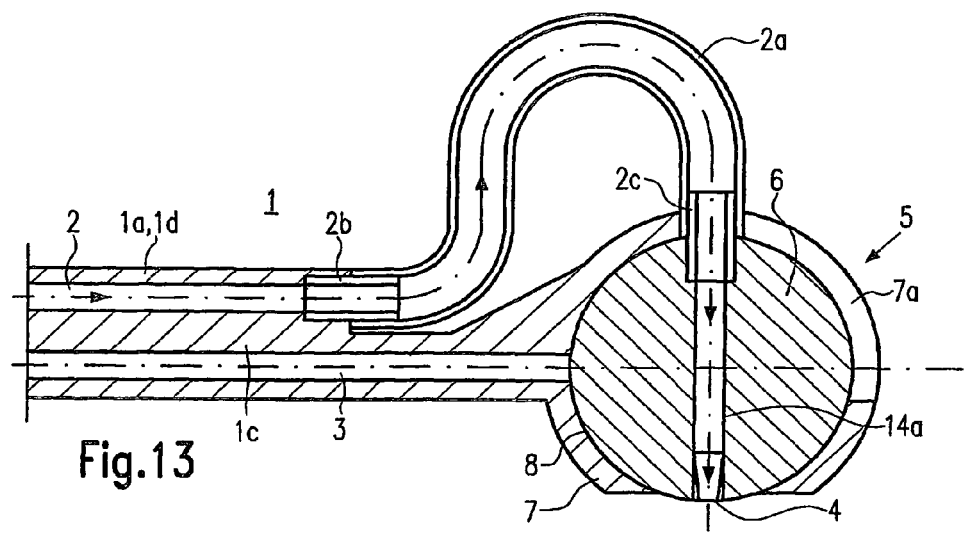
Figure 14:
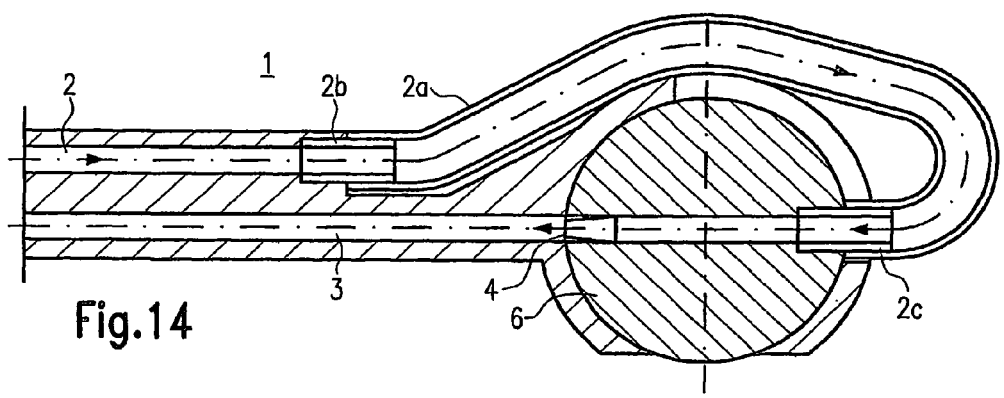
Figure 15:
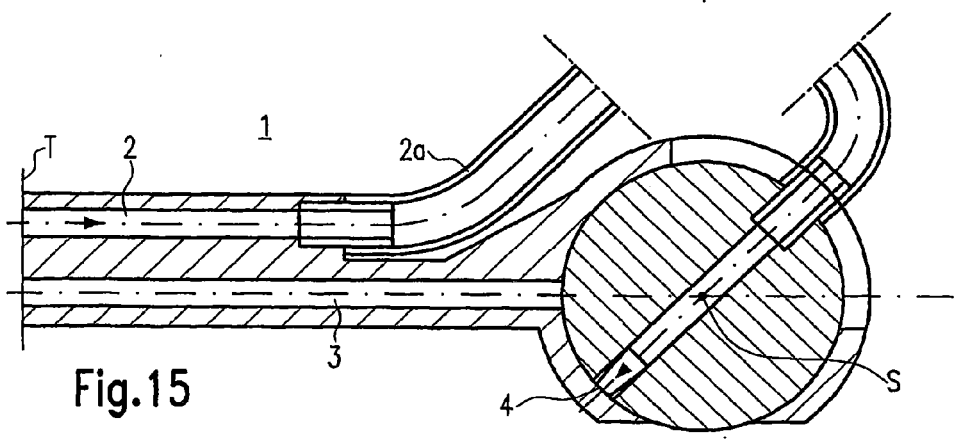

The fourth embodiment of a discharge tubule 1 illustrated in FIGS. 13 to 15 represents a modification of the embodiment illustrated in FIGS. 1 to 4. In contrast to this, with the fourth embodiment only the return duct 3, formed next to the outlet duct 2 in the base body 1a, leads into the cavity 8 of the connecting device 5. The outlet duct 2 is in contrast formed in a region near to the connecting device 5 as a flexible duct 2a, for which in particular a hose-shaped element can be used. Preferably, the flexible duct section 2a is made from corrosion-resistant, permanently elastic material and is preferably realized transparently, so that a flow of liquid can be determined before it flows through the outlet port 4.

On its initial section in a direction against the direction of flow, the flexible duct 2a is preferably connected sealed tight against fluids via a tubular connecting element 2b to the base body 1a of the discharge tubule 1. At its end pointing in the direction of flow, the flexible duct 2a is directed via a further tubular connecting element 2c, sealed against fluids, to the adjusting core 6 of the connecting device 5. The outlet duct 2 therefore transfers via its flexible duct section 2a directly to a passage channel 14a arranged in the adjusting core 6, the said passage channel terminating in the outlet port 4.

In FIG. 13 the fourth embodiment of a discharge tubule just described is illustrated in a discharge operating position. FIG. 14 illustrates the same discharge tubule with which the adjusting core has been rotated by 90° in the clockwise direction to bring the discharge tubule into a return operating position.

As can be seen from FIGS. 13 to 15, the actuating sleeve 7 comprises a recess 7a for this purpose, in the region of which the flexible duct section 2a of the outlet duct 2 can be swiveled at its end situated on the downstream side together with the adjusting core 6 about the adjusting axis S.

In the return operating position illustrated in FIG. 14 fluid flows through the base body 1a or the base part 1c and the change part 1d thereof within the outlet duct 2 in order to then gain access through the flexible duct section 2a of the outlet duct 2 into the passage channel 14a of the adjusting core 6 and then to flow via the outlet port 4 again into the return duct 3 which passes the fluid back to a fluid reservoir.

FIG. 15 illustrates the discharge tubule 1 in a closed position in which the adjusting core 6 is rotated into a position between the discharge operating position and the return operating position. In this way the outlet port 4 is closed in that it comes to contact the inner side of the adjusting sleeve 7 so that no fluid can be emitted.

This described embodiment comprises the advantage that neither an internal nor an external dead volume exists and a shut-off occurs already after a rotation of 45°, referred to the discharge operating position. At the shut-off both the outlet duct and also the return duct are sealed off. The flexible duct section of the outlet duct can in a modified form be covered with a partial tap housing to prevent damage.

A fifth embodiment of a discharge tubule is illustrated in FIGS. 16 to 22.

The illustrated discharge tubule 51 differs from the previously described embodiments essentially in that the outlet duct 52 and the return duct 53 are arranged in a horizontal plane whereas with the embodiments previously described the outlet duct 2 and the return duct 3 are formed vertically above one another in the base body 1a of the discharge tubule 1.

A base body 51a of the discharge tubule 51 can in turn be formed from one or many parts, in particular it can exhibit a base part 51c and an change part 51d. It is also conceivable to arrange a change part 51d of the discharge tubule 51 directly or via a transition piece on a base part 1c of a discharge tubule 1 and to establish a fluid connection to it. Also the change part 51d of the discharge tubule 51 can be rotated by 90° and connected directly to a base part 1c of a discharge tubule 1.

Otherwise the principle construction of the discharge tubule 51 is comparable with the embodiments previously described so that in the following only the differences are explained in more detail. Also the materials and manufacturing methods of the individual embodiments of the discharge tubule according to the invention correspond in each case.

In contrast to the previously described embodiment the adjusting axis S of the discharge tubule 51 is no longer formed transverse to the direction of fluid flow through the outlet duct, but rather parallel to it. Preferably the central axis of the outlet duct also forms the adjusting axis of the adjusting core 56.

The adjusting core 56 is part of a connecting device 55, the adjusting sleeve 57 of which is formed integrally with the base body 51*a* of the discharge tubule 51. Preferably the adjusting sleeve 57 is formed as a cylindrically shaped recess on the face side of the base body 51*a* on its free end which is opposite to the dividing point T.

The outlet duct 52 formed in the base body 51*a* is separated from the return duct 53, similarly formed in the said body and arranged parallel to the outlet duct, by a partition section 51*b*. Preferably, both ducts are realized as tubular ducts with circular cross-section, but other forms, e.g. a concentric arrangement, are also conceivable.

In the described embodiment the outlet duct 52 terminates here directly in the cylindrical recess 58 in which the adjusting core 56 fits for rotational movement about the adjusting axes S, but is sealed for fluids. Preferably the outlet duct terminates in the centre of the bottom surface of the cylindrical recess 58. On one side of the jacket surface of the cylindrical recess 58 the return duct 53 terminates which is formed in the region of the adjusting device 55 angled about 90° towards the outlet duct.

In the adjusting core 56 itself an L-shaped channel 59 is formed which extends from an opening on the base surface of the cylindrical adjusting core 56 on the opening point of the outlet duct 52 into the outlet port 4 which is formed on the jacket surface of the cylindrical adjusting core 56.

Figure 16:
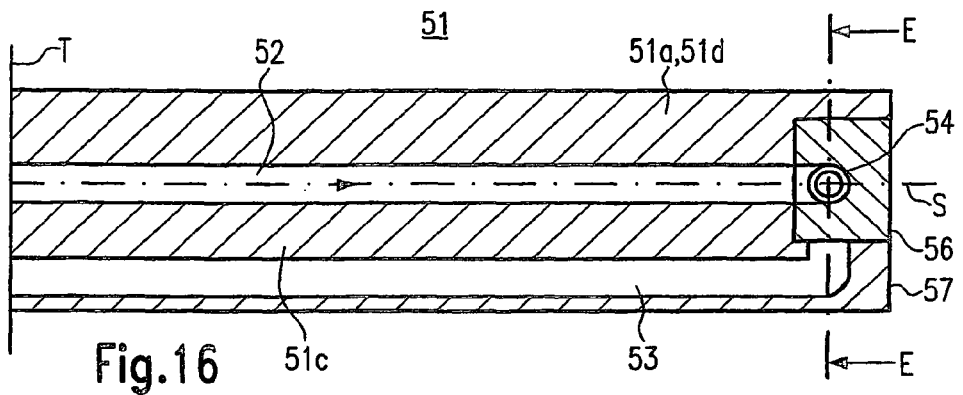
Figure 17:
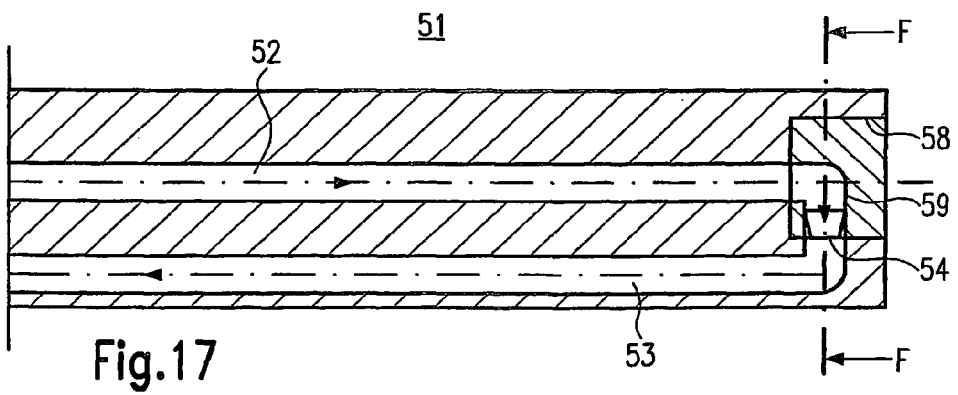
Figure 18:
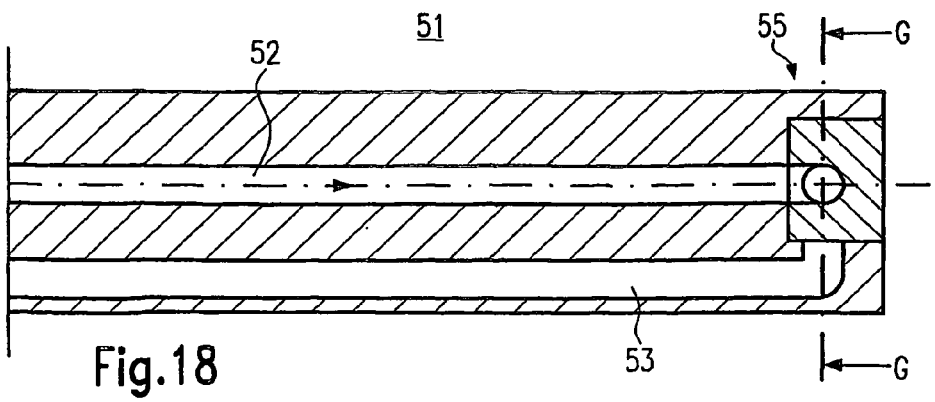
Figure 19:
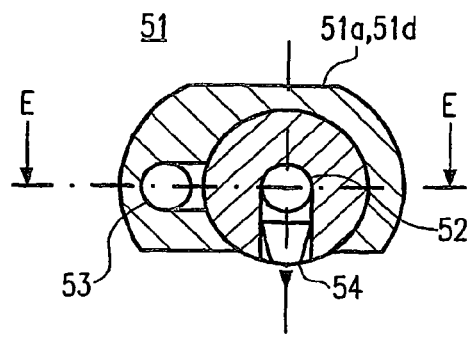
Figure 20:
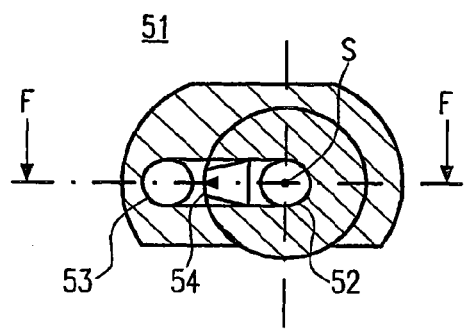
Figure 21:
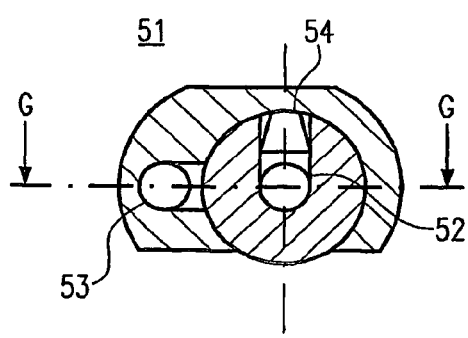
Figure 22:
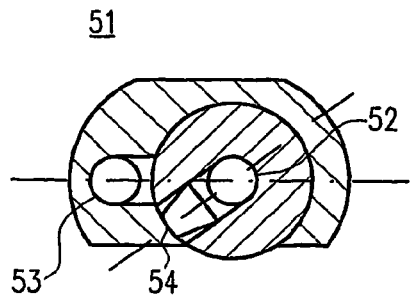

In a return operating position illustrated in FIGS. 17 and 20 the exit opening of the return duct 53 and the outlet port 54 of the channel 59 coincide. The return operating position, as shown in FIG. 20, can be reached from the discharge operating position, as shown in FIGS. 16 and 19, in that the adjusting core 56 is rotated by 90° in the clockwise direction. With a further rotation of 90° a closed position is obtained, as shown in FIGS. 18 and 21. An alternative closed position is shown in FIG. 22, whereby the adjusting core 56 has only been rotated by 45° in the clockwise direction with respect to the discharge operating position.

Also with this fifth embodiment described based on FIGS. 16 to 22 the discharge tubule according to the invention comprises neither an internal nor an external dead volume. An advantage here is, as with the embodiments already described, that in the closed position the outlet duct and the return duct are sealed and secured against the emission of fluid.

Due to its compactness, this embodiment is particularly suitable for dosing devices for the dosage of small amounts. Of course, this embodiment, as also all others, can be formed in various sizes so that different duct diameters and outlet cross-sections can be formed depending on the respective requirements.

A sixth, modified embodiment of a discharge tubule 71 is illustrated in FIGS. 23 to 31.

The details not illustrated or not further described correspond again to the previously described embodiments of a discharge tubule, in particular its base body 71*a* can be realized in one or more parts as previously described.

In this respect it should also be noted that the change parts 1*d*, 51*d*, 71*d* and 101*d* of the respective embodiments of discharge tubules can be connected either directly or via suitable adapters to a universal base part 1*c* of the base body 1*a* of the discharge tubule according to the invention, whereby the base part 1*c* is permanently connected to a valve block 35 of a dosing device or is realized integrally with it.

The base part 1*c* of the discharge tubule 1 according to the invention in this respect comprises, as already previously described, on its open end a partition section 1*c* to which all variants of change parts of the discharge tubule according to the invention can be fitted or interchanged.

Also with this method of attachment a further completely normal end part of a discharge tubule can be fitted, in particular one that seals the return duct and only facilitates a fluid flow through the outlet duct to an outlet port. In this type of end part of a discharge tubule a shut-off device can be provided, but it is not mandatory.

Figure 23:
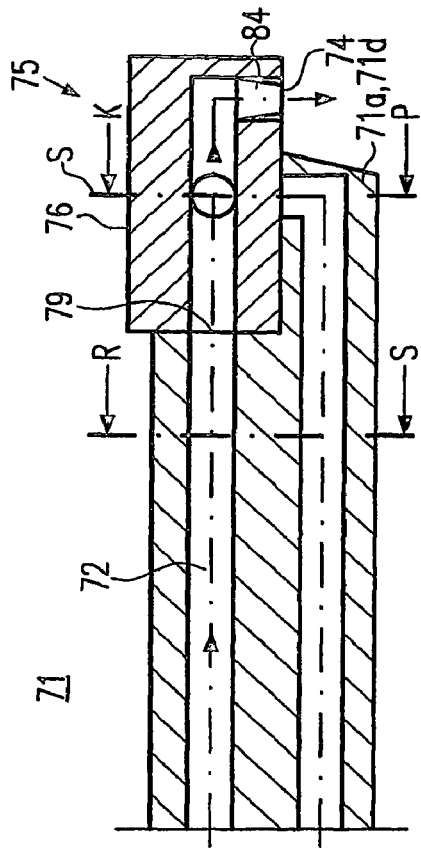
Figure 24:
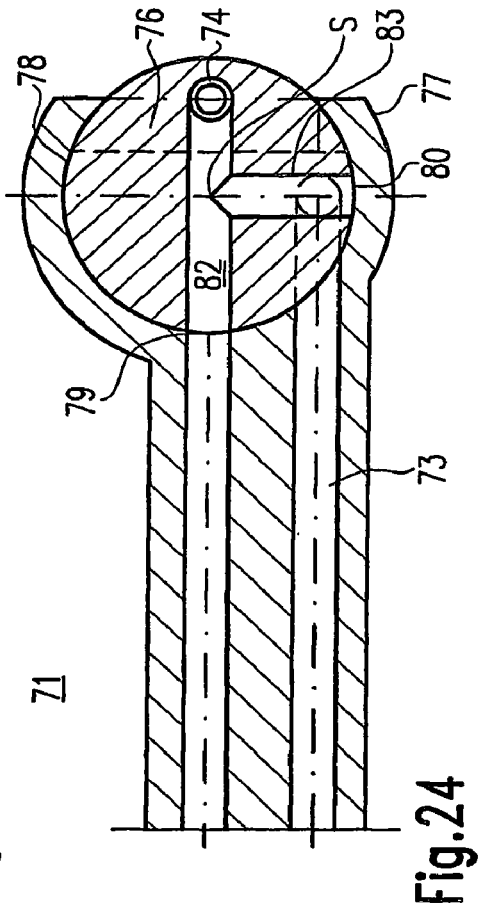
Figure 25:
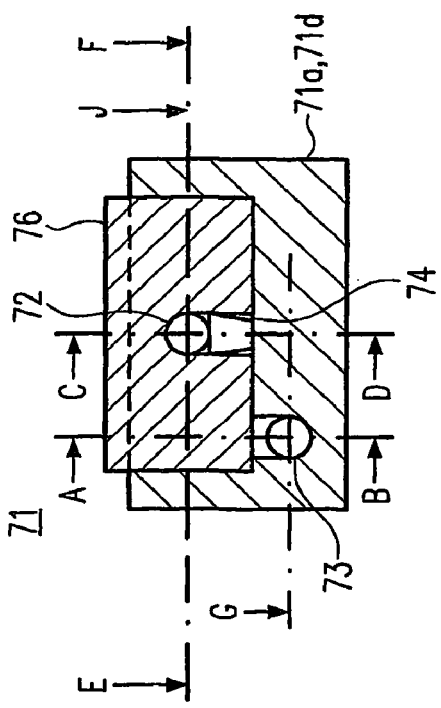

FIGS. 23 to 25 show the sixth embodiment of a discharge tubule 71 in a discharge operating position.

In a base body 71*a*, 71*d* of the discharge tubule 71, which can be formed in one or many parts and can comprise in particular a base part 1*c* and an change part 71*d*, an outlet duct 72 and a return duct 73 are formed parallel to one another in a vertical plane. At the free end of the discharge tubule 71 an adjusting device 75 with an adjusting sleeve 77 and a rotatable supported adjusting core 76, which is sealed for liquids, are formed.

The adjusting core 76 here rotates about a vertical adjusting axis S, which preferably intersects the centre line of the outlet duct 72. Three channels 82, 83, 84 are formed in the adjusting core 76, whereby the first channel 82 extends horizontally in the discharge operating position in an extension of the outlet duct 72. At its end it transfers into a vertical channel 84 which terminates at the outlet port 74, which is formed on the underside of the cylindrical adjusting body 76 in its base surface.

At about half way between the beginning of the first channel 82 (inlet port 79 on one side of the jacket surface of the cylindrical adjusting body 76) and the transition of the first channel 82 into the vertical channel 84, a horizontal transverse channel 83, which leads into a second opening 80 on another side in the jacket surface of the cylindrical adjusting body 76, branches from the horizontal channel 82.

In the discharge operating position of the adjusting body 76 illustrated in FIGS. 23 to 25 this opening 80 is sealed by the inner side of the adjusting sleeve 77 and the exit of the return duct 73 into the cavity 78 of the adjusting sleeve 77 is also closed, sealed for fluids, by the base surface of the adjusting core 76.

FIGS. 26 to 28 illustrate the discharge tubule 71 in a return operating position in which the adjusting core 76 is rotated by 90° in the clockwise direction.

In this position the opening 80 of the second horizontal channel 83 is positioned at the opening of the outlet duct in the cavity 78 of the adjusting sleeve 77 so that fluid can flow from the outlet duct into the channel 83. While the first opening 79 of the first horizontal channel 82 is sealed and closed by the inner side of the adjusting sleeve 7, the outlet port 74 of the vertical channel 84 is positioned opposite the inlet port of the return duct 73 so that fluid can flow into the return duct 73 from the outlet duct 72 via the channels 83, 82 and 84.

FIGS. 29 to 31 illustrate the discharge tubule 71 in a closed position, in which the inlet port of the outlet duct 72 into the cavity 78 of the connecting device 75 is sealed by the jacket surface of the adjusting core 76, the inlet surface of the return duct 73 is sealed by the bottom base surface of the adjusting core 76 and with which the openings 79, 80 and the outlet port 74 are similarly sealed by the inner side of the adjusting sleeve 77 so that emission of the fluid or the drying out of fluid is prevented.

Also with this embodiment no external dead volume exists. A shut-off occurs already after a rotation of about 30° with respect to the outlet operating position. The outlet duct and the return duct are arranged parallel to one another in the base body 71a, but offset horizontally and vertically to one another.

In the region of the separation point T of the change part 71d of the base body 71a of the discharge tubule 1 preferably transition channels are arranged which transfer the duct openings into a position in which both ducts come to rest in a vertical plane so that the change part 71d can be directly connected to a base part 1c of the discharge tubule.

A seventh embodiment of the device according to the invention for the discharge of a liquid is illustrated in FIGS. 32–35 in the form of a dosing dispenser with an integrally formed supplying or dosing cylinder and a discharge tubule with integrally formed return duct. The same parts or those with corresponding functions bear the same or corresponding reference symbols as in the previously described embodiment and exhibit corresponding advantages. The discharge tubule 201 is illustrated here in a preferred embodiment in FIGS. 33 to 35 in various operating positions.

The discharge tubule 201 illustrated in FIGS. 32 to 35 comprises a base body 201a which is preferably produced in a synthetic material, but other suitable materials, in particular for example metals, ceramics, etc. are conceivable. In the base body 201a of the discharge tubule 201 both an outlet duct 2 and a return duct 3 are formed. The outlet duct 2 and the return duct 3 are separated from one another by a partition 1b, which is formed integrally with the base body 201a. Both the outlet duct 2 and also the return duct 3 preferably exhibit a circular cross-section and with the first embodiment illustrated here terminate at a face of an adjusting device 205. Other cross-sectional shapes of the ducts or channels are also conceivable.

The adjusting element 205 extends the base body 201a in its longitudinal direction as a part of the discharge tubule 201. In this regard it can be rotated with respect to a longitudinal axis of the base body 201a which continues in an adjusting axis S of the adjusting device 205. Here, the adjusting device 205 is coupled to the base body 201a and secured against falling down so that a rotationally movable connection is established, sealed for fluids, between the contacting faces of the base body and the adjusting device 205. This occurs, for example, by positive-lock clipping of a groove on a projection which is formed along an overlapping region 201a on the jacket surfaces of the base body 201a and the adjusting element 205.

Figure 32:
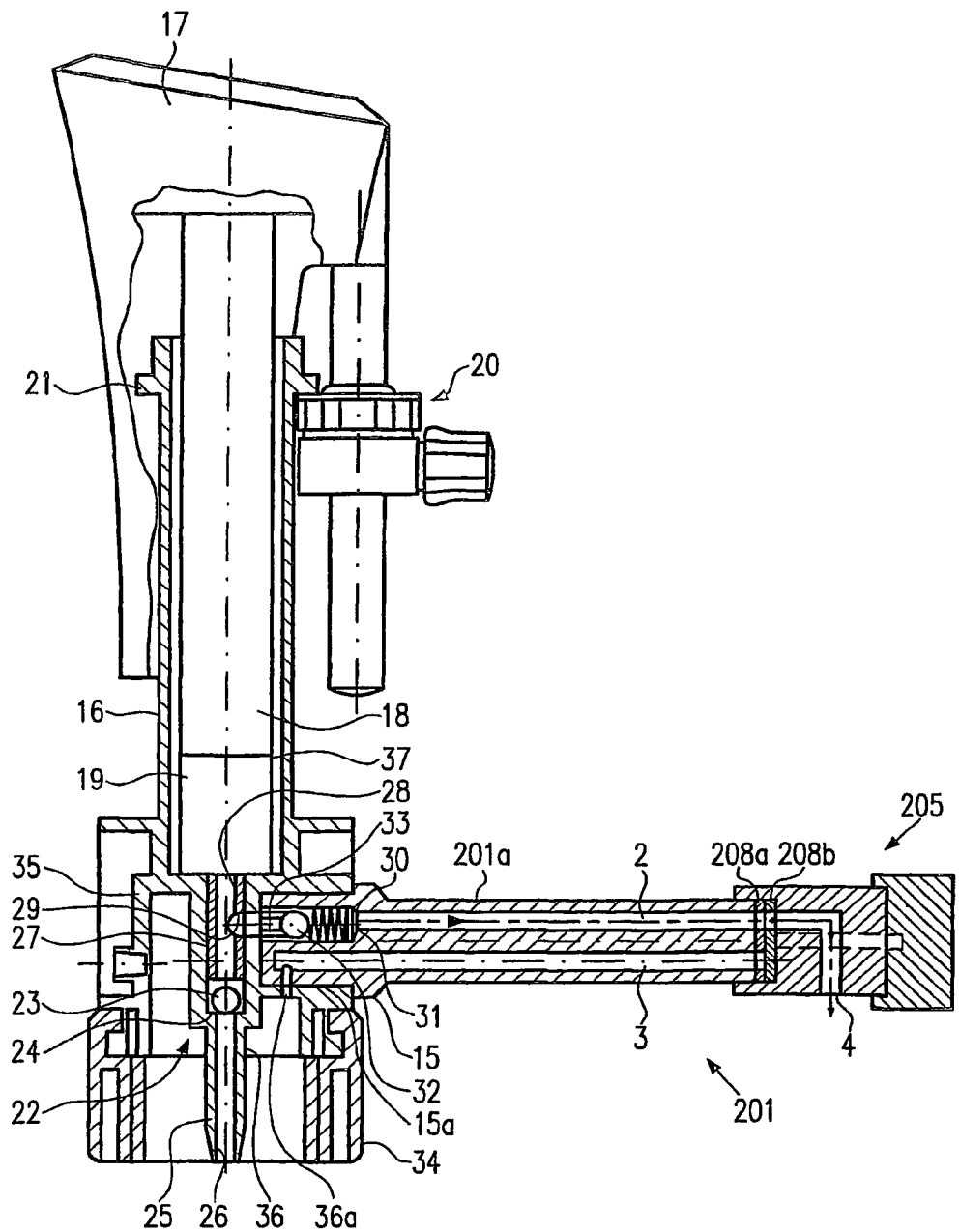

In order to facilitate an easy movement of the adjusting device relative to the base body 201a and to furthermore facilitate reliable sealing of the inlet opening of the return duct 3, preferably two sliding discs 208a, 208b are provided between the adjusting device 205 and the base body 201a, as illustrated in FIG. 32, and which are held by the adjusting device 205 and an engaging structure, not shown here in further detail, between the adjusting device 205 and the base body 201a in a close position to the face of the base body 201a.

The sliding discs 208a, 208b are preferably formed from a glass, synthetic material or ceramic material and are provided with through openings which can be brought in a covering position depending on the position of the adjusting device 205.

In the embodiment illustrated here the adjusting device 205 is constructed as follows. Due to production reasons, it essentially comprises two base components, the adjusting core 206 and the actuator 207. Apart from the channels formed in it, the adjusting core 206 is essentially rotationally symmetrical with respect to the adjusting axis S. Two parallel channels, the limbs 213a and 213b of the return channel 213, extend parallel to the said axis in the longitudinal direction of the adjusting core 206 through the base body 206 over its length. The spacing of these channels and the arrangement correspond to the spacing and arrangement of the outlet duct 2 and the return duct 3 so that the respective face sides of the ducts 2, 3 and the limbs 213a, 213b meet the through openings 9 and 10 at their contact points.

Figure 33:
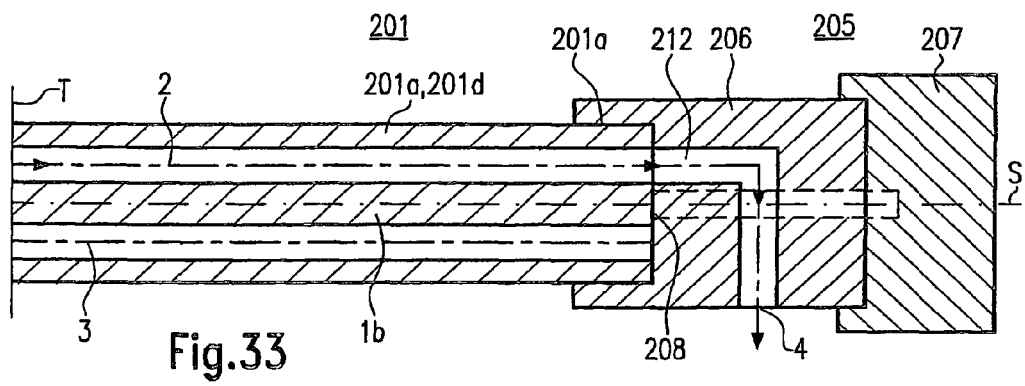
Figure 34:
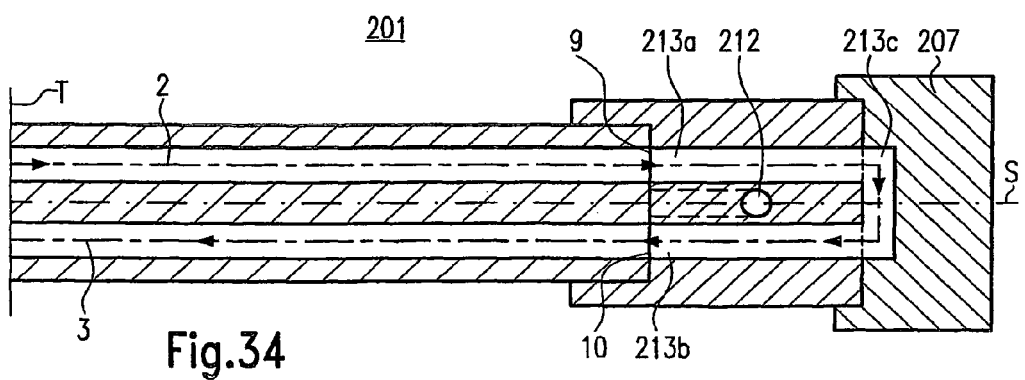
Figure 35:
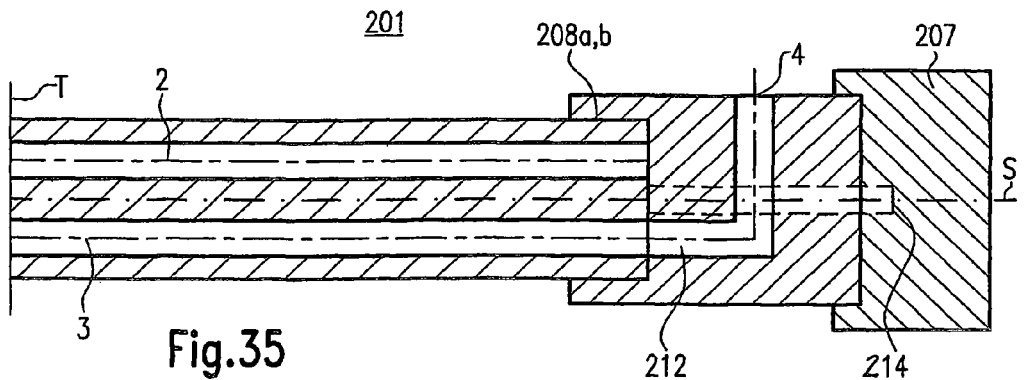

Between the two parallel limbs 213a, 213b of the return channel 213, as shown for example in FIG. 34, a further channel, the outlet channel 212 is formed. In this respect the outlet channel 212 extends in a plane, which is perpendicular to the plane in which the two limbs 213a, 213b of the return channel 213 are arranged. The outlet channel 212 is, as shown in FIG. 33, formed essentially L-shaped, whereby a first limb parallel to the two limbs 213a, 213b of the return channel is formed and preferably is formed as short as possible to reduce the dead volume that cannot be flushed. It is also conceivable that this limb is not formed or that the length of the limb only corresponds to the diameter of a second limb.

The second limb of the outlet channel 212, the central axis of which is perpendicular to the axis of the channels 2, 3 and to the adjusting axis S, leads from the first limb via the outlet port 4 to the outside air. In the extreme case the first limb of the outlet channel 212 is formed so short that the second limb, which leads to the outlet port 4, is formed directly on the face side 208 or tubular or channel shaped on the sliding discs 208a, 208b (one channel side is formed by the sliding disc 208b). In this way a particularly small dead volume is obtained in the outlet channel 212.

The actuator 207 abuts the side of the adjusting core 206 facing away in the base body 201a and seals both of the limbs 213a, 213b to the outside.

Adjacent to the openings of the limbs 213a, 213b of the return channel 213, facing away from the base body 201a, a U-shaped or preferably slot-shaped connecting channel 213c is formed in the actuator 207, whereby a flow connection between the two limbs 213a, 213b is established. This connecting channel can however also be formed as a hole, which is arranged concentrically to the adjusting axis S, and its outside diameter corresponds to the outer distance of the two limbs 213a, 213b, whereby however the volume of the return channel 213 is increased.

Of course, the adjusting device 205 can also be formed integrally, especially in that the channels are not drilled separately afterwards, but rather molded in. In this respect a longer return channel 213 is then formed in the adjusting device 205, via which it is diverted and returned to it again, as well as a shorter outlet channel 212, via which the fluid emitted from the base body 201a of the discharge tubule can be discharged into the outside air.

With the functional position of the adjusting device 205 illustrated in FIG. 34 it bridges the outlet duct 2 and the return duct 3 and consequently facilitates the flow of liquid, indicated simplified by the arrows, from the supplying or dosing cylinder 35 back into a container, which is not illustrated here, or a comparable collection device. In this way it is possible for example to supply a larger amount of liquid via the supplying or dosing cylinder 35 and through the discharge tubule 201, whereby it is ensured that in the meantime no old liquid or for example no liquid which has changed its concentration due to drying is located in the discharge tubule 201. This can be especially realized in that air is pumped through the discharge tubule.

On a side of the base body 201a facing away from the face 208 the discharge tubule 201 is provided with a mounting section 15 via which the discharge tubule 201 can be fitted to a valve block designated here with the reference symbol 35. In the embodiment illustrated here the mounting section 15 comprises an essentially cylindrical press-fit pin section 15a which is press-fitted with a close fit into an appropriately formed fitting hole in the valve block 35.

Alternatively to the illustrated embodiment of the mounting section 15, it is also possible to form the discharge tubule 1 integrally with the valve block or for example to connect it to the valve block 35 via a threaded device. The threaded device is advantageously designed such that no cavity remains between the thread faces in the tightened state. This can in particular be achieved through a slightly conical thread. Similarly the discharge tubule can, as already described based on the first embodiment, be formed from many parts.

With the seventh embodiment illustrated here the outlet duct 2 and the return duct 3 are formed adjacently to one another. It is also possible to form the outlet duct 2 and the return duct 3 above one another or coaxially with respect to one another so that one of the two ducts is formed by an appropriately dimensioned annular space. The return duct 3 extends through uninterrupted from the outlet port of the outlet duct 2 back to the valve block 35.

Of course, other embodiments, which represent a modification of the illustrated and described embodiments, are always conceivable. With these types of modifications a significant feature may be that the outlet port, 4, 104, which is connected to an outlet duct 2, also passes flow in a return operating state and therefore represents one part of the recirculation system, i.e. the connection to the return duct. Also, the embodiments can be combined together.

The invention is not restricted to the previously described embodiments. For example it is also possible, in particular with an embodiment of the discharge tubule with coaxially arranged channels, to plug the adjusting device into the discharge tubule. It is also possible to design the adjusting device as a cap which can be removed from the discharge tubule, for example to facilitate cleaning of liquid residues from the individual parts.

What is claimed is:

1. A Liquid dispenser comprising a supplying device with a supplying or dosing cylinder, a supplying or dosing plunger movable therein for supplying liquid from a container to an outlet duct, for the delivery of the liquid via an outlet port of the outlet duct, wherein the outlet duct and a return duct extending along the outlet duct are formed in a discharge tubule, and wherein a connecting device is provided which comprises the outlet port of the outlet duct, and by means of which the outlet port is connectable to the return duct.

2. Liquid dispenser according to claim 1, wherein the discharge tubule is connected to a valve block, and wherein a liquid feed channel being connected to the outlet duct and a liquid return channel being connected to the return duct are provided in the valve block.

3. Liquid dispenser according to claim 2, wherein the discharge tubule is press-fitted into the valve block.

4. Liquid dispenser according to claim 2, wherein the discharge tubule is connectable to the valve block by means of a releasable connection, in particular one of a threaded screw-in connection and a bayonet connection.

5. Liquid dispenser according to 2, wherein the discharge tubule comprises a base part which is connectable to the valve block, and at least one exchangeable change part which can be coupled to the base part.

6. Liquid dispenser according to claim 5, wherein the base part comprises an integrated outlet duct for the delivery of a liquid via the outlet port and an integrated return duct which extends along the outlet duct.

7. Liquid dispenser according to claim 5, wherein the change part comprises at least one outlet port which can be brought into a fluid connection with the outlet duct of the base part.

8. Liquid dispenser according to claim 2, wherein the supplying or dosing cylinder is formed integrally with the valve block, in particular being a cylinder which is integrally extrusion-coated with a synthetic material, preferably being a glass cylinder.

9. Liquid dispenser according to claim 2, wherein the supplying or dosing cylinder is screwed into the valve block.

10. Liquid dispenser according to claim 2, wherein the supplying or dosing cylinder comprises a cylinder insert formed from one of a glass, a ceramic, a thermoplastic and a duroplastic synthetic material, which is accommodated in a jacket section formed integrally with the valve block and which, in particular, is injection molded.

11. Liquid dispenser according to claim 2, wherein the valve block is formed as a skeleton construction with spaced webs.

12. Liquid dispenser according to claim 11, wherein the valve block is provided with a holding recess for the accommodation of a base section of the discharge tubule whereby the holding recess at the valve block passes radially through a web extending in an axial plane.

13. Liquid dispenser according to claim 12, wherein a discharge tubule positioning device is provided for defining the position of the discharge tubule on the valve block.

14. Liquid dispenser according to claim 13, wherein the discharge tubule positioning device comprises an engaging section, formed on the discharge tubule end and which can be brought into engagement with an engaging counter section formed on the valve block end.

15. Liquid dispenser according to claims 13, wherein an engaging section is formed on the valve block in the region of the holding recess and can be brought into engagement with an engaging counter section formed on the discharge tubule end.

16. Discharge tubule kit system, in particular for a liquid dispenser, comprising a base part which can be coupled to the liquid dispenser and a number of change parts of discharge tubules on which at least one outlet port is formed, respectively, whereby the base part is connectable in a releasable manner to each of the change parts, and wherein at least the base part comprises an integrated outlet duct leading into the outlet port for dispensing a liquid, and an integrated return duct which extends along the outlet duct.

17. Discharge tubule, in particular for one of a liquid dispenser and a discharge tubule kit system, comprising an outlet duct integrated in the discharge tubule for dispensing a liquid via an outlet port and a return duct integrated in the discharge tubule and extending along the outlet duct, wherein the outlet port is movable for generating a connection with the return duct.

18. Discharge tubule according to claim 17, wherein the outlet port is part of a connecting device.

19. Discharge tubule according to claim 18, wherein the connecting device can be brought into a first position, at which the outlet duct is connected for flow to the outlet port, and in which the return duct is closed to the outside by the connecting device.

20. Discharge tubule according to claim 19, wherein the connecting device can be brought into a second position, in which the outlet duct and the return duct are in fluid connection, wherein the outlet port is directly adjacent to the return duct.

21. Discharge tubule according to claim 20, wherein the connecting device can be brought into at least a third position, in which the outlet duct and the return duct are closed to the outside, respectively.

22. Discharge tubule according to claim 18, wherein the connecting device can be brought into a position in which the outlet port is closed to the outside.

23. Discharge tubule according to claim 17, wherein the outlet duct and the return duct have approximately the same length and diameter.

24. Discharge tubule according to claim 18, wherein the connecting device comprises an adjusting core, which can be rotated about an adjusting axis, wherein the adjusting core is arranged in an adjusting sleeve.

25. Discharge tubule according to claim 24, wherein the adjusting sleeve is formed as an integral part of one of a base body and a change body of the discharge tubule.

26. Discharge tubule according to claim 24, wherein the adjusting sleeve comprises a cavity in its interior, which is essentially completely filled by the adjusting core, wherein the cavity can be connected with the outlet duct via a first opening, with the return duct via a second opening, and towards the outside via a third opening.

27. Discharge tubule according to claim 24, wherein a number of channels is formed in the adjusting core, which are in fluid connection with one another, wherein at least a part of one of the channels is formed in a region of the adjusting axis.

28. Discharge tubule according to claim 24, wherein the adjusting core is at least partially formed as a rotational body with respect to the adjusting axis, in particular having one of a spherical shape, a conical shape, a cylindrical shape, a toroidal shape, a segment of a boundary surface of one of these shapes, and a partial segment of a boundary surface of one of these shapes.

29. Discharge tubule according to claim 24, wherein the adjusting axis runs essentially perpendicular to the longitudinal direction of the outlet duct.

30. Discharge tubule according to claim 24, wherein the adjusting sleeve is essentially ring-shaped or ring-segment-shaped in cross-section in a plane in which at least one of a duct and a channel is arranged.

31. Discharge tubule according to claim 30, wherein the ring-shaped or ring-segment-shaped adjusting sleeve is flattened on one side.

32. Discharge tubule according to claim 17, wherein the outlet port is formed to be movable with respect to a base body of the discharge tubule.

33. Discharge tubule according to claim 32, wherein the outlet port is formed to be rotatable with respect to a base body of the discharge tubule.

34. Discharge tubule according to claim 17, wherein the discharge tubule is formed to be dividable into at least a base part and an change in a direction transversely to the longitudinal axis of the outlet duct.

35. Discharge tubule according to claim 24, wherein the adjusting axis runs essentially parallel to the longitudinal direction of the outlet duct.

36. Discharge tubule according to claim 17, wherein a duct section of the outlet duct is formed to be flexible.

* * * * *